United States Patent
Vassilovski et al.

(10) Patent No.: US 11,506,746 B1
(45) Date of Patent: Nov. 22, 2022

(54) SIDELINK-BASED POSITIONING USING SIDELINK SIGNALING

(71) Applicant: QUALCOMM Incorporated, San Diego, CA (US)

(72) Inventors: Dan Vassilovski, Del Mar, CA (US); Hong Cheng, Basking Ridge, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/330,225

(22) Filed: May 25, 2021

(51) Int. Cl.
| | |
|---|---|
| H04W 4/02 | (2018.01) |
| G01S 5/02 | (2010.01) |
| H04W 4/06 | (2009.01) |
| H04L 5/00 | (2006.01) |
| H04W 72/04 | (2009.01) |
| H04W 64/00 | (2009.01) |

(52) U.S. Cl.
CPC ............ G01S 5/0289 (2013.01); H04L 5/005 (2013.01); H04W 4/023 (2013.01); H04W 4/06 (2013.01); H04W 72/0406 (2013.01); H04W 64/003 (2013.01)

(58) Field of Classification Search
CPC ...... G01S 5/0289; H04L 5/005; H04W 4/023; H04W 4/06; H04W 72/0406; H04W 64/003
See application file for complete search history.

(56) References Cited

U.S. PATENT DOCUMENTS

| | | | |
|---|---|---|---|
| 2017/0212206 A1 | 7/2017 | Kim et al. | |
| 2019/0239181 A1* | 8/2019 | Gangakhedkar | H04W 76/10 |
| 2020/0145867 A1 | 5/2020 | Tseng et al. | |
| 2021/0058889 A1* | 2/2021 | Zhang | H04W 64/003 |

(Continued)

FOREIGN PATENT DOCUMENTS

| | | |
|---|---|---|
| WO | WO-2020256311 A1 | 12/2020 |
| WO | WO-2021040501 A1 | 3/2021 |

OTHER PUBLICATIONS

NPL (WO/2022/034175 A1) discloses a method of operating a communications device to provide a ranging-base service. (Year: 2022).*

(Continued)

*Primary Examiner* — Siu M Lee
(74) *Attorney, Agent, or Firm* — Danai Nelisile Mehembere; Holland & Hart LLP

(57) ABSTRACT

Methods, systems, and devices for wireless communication are described. An initiator user equipment (UE) may broadcast, via a sidelink connection to a set of target UEs, a group sidelink communication request that includes a sidelink ranging service identifier. The group sidelink communication request may further include a broadcast identifier or a groupcast identifier. The initiator UE may establish, via the sidelink connection, a set of unicast sidelink sessions with the set of target UEs. some examples, the initiator UE may transmit, via the sidelink connection, a set of position reference signal requests via the set of unicast sidelink sessions to initiate a set of sidelink ranging sessions. The initiator UE may then receive, via the sidelink connection, a set of position reference signal responses from the set of target UEs during each of the plurality of sidelink ranging sessions.

30 Claims, 14 Drawing Sheets

(56) References Cited

U.S. PATENT DOCUMENTS

2022/0015059 A1  1/2022  Tenny
2022/0039052 A1  2/2022  Choi et al.

OTHER PUBLICATIONS

International Search Report and Written Opinion—PCT/US2022/027092—ISA/EPO—dated Aug. 12, 2022.
Qualcomm Incorporated., et al., "Update of Unicast Link Establishment for Security Protection", 3GPP TSG-SA WG2 Meeting #136, S3-200623.Zip, S2-1912001, 3GPP, Mobile Competence Centre, 650, Route Des Lucioles, F-06921 Sophia-Antipolis Cedex, France, vol. SA WG2, No. Reno, Nevada, USA, Nov. 18, 2019-Nov. 22, 2019, Apr. 2, 2020, XP051868408, 6 Pages.

* cited by examiner

SIDELINK-BASED POSITIONING USING SIDELINK SIGNALING

FIELD OF TECHNOLOGY

The following relates to wireless communication, including sidelink-based positioning using sidelink signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Wireless communications devices may perform sidelink-based ranging techniques. In some wireless communications systems, sidelink-based ranging techniques may be improved.

SUMMARY

The described techniques relate to improved methods, systems, devices, and apparatuses that support sidelink-based positioning using sidelink signaling. Generally, the described techniques provide for sidelink-based ranging using sidelink connection. Sidelink-based ranging may function via a three-way handshake for session establishment. For example, two or more wireless communications devices may initiate in a three-step process to exchange synchronization and acknowledgement messages to establish a connection for data communication. The three-way handshake may be followed by an exchange of position reference signals (PRSs) which the one or more wireless communications devices may use to determine relative and absolute positioning. According to aspects depicted herein, an initiator user equipment (UE) may broadcast, via a sidelink connection to a set of target UEs, a group sidelink communication request that includes a sidelink ranging service identifier. The group sidelink communication request may also include a broadcast identifier or a groupcast identifier. The initiator UE may establish a unicast sidelink session with each target UE. Upon establishment of the unicast sidelink session, the initiator UE a may transmit a request (e.g., PRSrequest) to one or more target UEs including information relevant to establish a sidelink ranging session, which the one or more target UEs may respond to with information further relevant to establishing the sidelink ranging session (e.g., PRSresponse). The initiator UE may then respond with a confirmation (e.g., PRSconfirmation). The handshaking messages (e.g., PRSrequest, PRSresponse, and PRSconfirmation) may be used to establish criteria for transmission of wideband PRSs of UEs participating in the sidelink based positioning procedure. This exchange may be concluded with a measurement message exchange (e.g., postPRS) in which the one or more wireless communications devices performing position based measurements relating to the other participating UEs and share the information regarding relative positioning. Thus, once each UE transmits (broadcasts) its PRS, the receiving UEs may perform measurements and incorporate the measurements into the post-PRS signaling message (e.g., last signaling message).

A method for wireless communication at an initiator user equipment (UE) is described. The method may include broadcasting, via a sidelink connection to a set of multiple target UEs, a group sidelink communication request that includes a sidelink ranging service identifier, establishing, via the sidelink connection, a set of multiple unicast sidelink sessions with the set of multiple target UEs, transmitting, via the sidelink connection, a set of multiple position reference signal requests via the set of multiple unicast sidelink sessions to initiate a set of multiple sidelink ranging sessions, and receiving, via the sidelink connection, a set of multiple position reference signal responses from the set of multiple target UEs during each of the set of multiple sidelink ranging sessions.

An apparatus for wireless communication at an initiator UE is described. The apparatus may include a processor, memory coupled with the processor, and instructions stored in the memory. The instructions may be executable by the processor to cause the apparatus to broadcasting, via a sidelink connection to a set of multiple target UEs, a group sidelink communication request that include a sidelink ranging service identifier, establish, via the sidelink connection, a set of multiple unicast sidelink sessions with the set of multiple target UEs, transmit, via the sidelink connection, a set of multiple position reference signal requests via the set of multiple unicast sidelink sessions to initiate a set of multiple sidelink ranging sessions, and receive, via the sidelink connection, a set of multiple position reference signal responses from the set of multiple target UEs during each of the set of multiple sidelink ranging sessions.

Another apparatus for wireless communication at an initiator UE is described. The apparatus may include means for broadcasting, via a sidelink connection to a set of multiple target UEs, a group sidelink communication request that includes a sidelink ranging service identifier, means for establishing, via the sidelink connection, a set of multiple unicast sidelink sessions with the set of multiple target UEs, means for transmitting, via the sidelink connection, a set of multiple position reference signal requests via the set of multiple unicast sidelink sessions to initiate a set of multiple sidelink ranging sessions, and means for receiving, via the sidelink connection, a set of multiple position reference signal responses from the set of multiple target UEs during each of the set of multiple sidelink ranging sessions.

A non-transitory computer-readable medium storing code for wireless communication at an initiator UE is described. The code may include instructions executable by a processor to broadcasting, via a sidelink connection to a set of multiple target UEs, a group sidelink communication request that include a sidelink ranging service identifier, establish, via the sidelink connection, a set of multiple unicast sidelink sessions with the set of multiple target UEs, transmit, via the sidelink connection, a set of multiple position reference signal requests via the set of multiple unicast sidelink sessions to initiate a set of multiple sidelink ranging sessions, and receive, via the sidelink connection, a set of multiple position reference signal responses from the set of multiple target UEs during each of the set of multiple sidelink ranging sessions.

In some examples of the method, apparatuses, and non-transitory computer-readable medium described herein, broadcasting the group sidelink communication request may include operations, features, means, or instructions for transmitting, via the sidelink connection to the set of multiple target UEs, the group sidelink communication request including a broadcast identifier or a groupcast identifier.

Some examples of the method, apparatuses, and non-transitory computer-readable medium described herein may further include operations, features, means, or instructions for transmitting a broadcast position reference signal message or a groupcast position reference signal message including the broadcast identifier or the groupcast identifier.

In some examples of the method, apparatuses, and non-transitory computer-readable medium described herein, receiving the set of multiple position reference signal responses may include operations, features, means, or instructions for receiving the set of multiple position reference signal responses that may be each a broadcast position reference signal response corresponding to the broadcast identifier or may be each a groupcast position reference signal response corresponding to the groupcast identifier.

Some examples of the method, apparatuses, and non-transitory computer-readable medium described herein may further include operations, features, means, or instructions for transmitting at least one position reference signal confirmation message in response to the set of multiple position reference signal responses.

In some examples of the method, apparatuses, and non-transitory computer-readable medium described herein, transmitting the at least one position reference signal confirmation message may include operations, features, means, or instructions for transmitting a set of multiple unicast position reference signal confirmation messages in response to the set of multiple position reference signal responses.

In some examples of the method, apparatuses, and non-transitory computer-readable medium described herein, transmitting the at least one position reference signal confirmation message may include operations, features, means, or instructions for transmitting a broadcast position reference signal confirmation message or a groupcast position reference signal confirmation message in response to the set of multiple position reference signal responses.

In some examples of the method, apparatuses, and non-transitory computer-readable medium described herein, receiving the set of multiple position reference signal responses may include operations, features, means, or instructions for receiving the set of multiple position reference signal responses that may be each a unicast position reference signal response.

In some examples of the method, apparatuses, and non-transitory computer-readable medium described herein, the set of multiple sidelink ranging sessions include a set of multiple application layer ranging sessions, and the set of multiple position reference signal requests and the set of multiple position reference signal responses may be processed at an application layer.

In some examples of the method, apparatuses, and non-transitory computer-readable medium described herein, the set of multiple sidelink ranging sessions include a set of multiple sidelink physical layer ranging sessions, and the set of multiple position reference signal requests and the set of multiple position reference signal responses may be processed at a sidelink physical layer.

In some examples of the method, apparatuses, and non-transitory computer-readable medium described herein, the set of multiple sidelink ranging sessions include a set of multiple radio resource control layer ranging sessions, and the set of multiple position reference signal requests and the set of multiple position reference signal responses may be processed at a radio resource control layer.

In some examples of the method, apparatuses, and non-transitory computer-readable medium described herein, the group sidelink communication request includes a PC5 sidelink message and the sidelink ranging service identifier includes a vehicle-to-everything (V2X) service identifier.

A method for wireless communication at a target UE is described. The method may include receiving, from an initiator UE via a sidelink connection, a group sidelink communication request that includes a sidelink ranging service identifier, establishing, via the sidelink connection, a unicast sidelink session with the initiator UE, receiving, via the sidelink connection, a position reference signal request via the unicast sidelink session to initiate a sidelink ranging session, and transmitting, via the sidelink connection, a position reference signal response to the initiator UE during the sidelink ranging session.

An apparatus for wireless communication at a target UE is described. The apparatus may include a processor, memory coupled with the processor, and instructions stored in the memory. The instructions may be executable by the processor to cause the apparatus to receive, from an initiator UE via a sidelink connection, a group sidelink communication request that includes a sidelink ranging service identifier, establish, via the sidelink connection, a unicast sidelink session with the initiator UE, receive, via the sidelink connection, a position reference signal request via the unicast sidelink session to initiate a sidelink ranging session, and transmit, via the sidelink connection, a position reference signal response to the initiator UE during the sidelink ranging session.

Another apparatus for wireless communication at a target UE is described. The apparatus may include means for receiving, from an initiator UE via a sidelink connection, a group sidelink communication request that includes a sidelink ranging service identifier, means for establishing, via the sidelink connection, a unicast sidelink session with the initiator UE, means for receiving, via the sidelink connection, a position reference signal request via the unicast sidelink session to initiate a sidelink ranging session, and means for transmitting, via the sidelink connection, a position reference signal response to the initiator UE during the sidelink ranging session.

A non-transitory computer-readable medium storing code for wireless communication at a target UE is described. The code may include instructions executable by a processor to receive, from an initiator UE via a sidelink connection, a group sidelink communication request that includes a sidelink ranging service identifier, establish, via the sidelink connection, a unicast sidelink session with the initiator UE, receive, via the sidelink connection, a position reference signal request via the unicast sidelink session to initiate a sidelink ranging session, and transmit, via the sidelink connection, a position reference signal response to the initiator UE during the sidelink ranging session.

In some examples of the method, apparatuses, and non-transitory computer-readable medium described herein, receiving the group sidelink communication request may include operations, features, means, or instructions for receiving the group sidelink communication request broadcasted to a set of multiple target UEs.

In some examples of the method, apparatuses, and non-transitory computer-readable medium described herein, receiving the group sidelink communication request may include operations, features, means, or instructions for receiving, from the initiator UE via the sidelink connection, the group sidelink communication request including a broadcast identifier or a groupcast identifier.

Some examples of the method, apparatuses, and non-transitory computer-readable medium described herein may further include operations, features, means, or instructions for receiving a broadcast position reference signal message or a groupcast position reference signal message including the broadcast identifier or the groupcast identifier.

In some examples of the method, apparatuses, and non-transitory computer-readable medium described herein, transmitting the position reference signal response may include operations, features, means, or instructions for transmitting a broadcast position reference signal response corresponding to the broadcast identifier or a groupcast position reference signal response corresponding to the groupcast identifier.

Some examples of the method, apparatuses, and non-transitory computer-readable medium described herein may further include operations, features, means, or instructions for receiving a position reference signal confirmation message in response to the position reference signal response.

In some examples of the method, apparatuses, and non-transitory computer-readable medium described herein, receiving the position reference signal confirmation message may include operations, features, means, or instructions for receiving a unicast position reference signal confirmation in response to the position reference signal response.

In some examples of the method, apparatuses, and non-transitory computer-readable medium described herein, receiving the position reference signal confirmation message may include operations, features, means, or instructions for receiving a broadcast position reference signal confirmation message or a groupcast position reference signal confirmation message in response to the position reference signal response.

In some examples of the method, apparatuses, and non-transitory computer-readable medium described herein, transmitting the position reference signal response may include operations, features, means, or instructions for transmitting a unicast position reference signal response.

In some examples of the method, apparatuses, and non-transitory computer-readable medium described herein, the sidelink ranging session includes an application layer ranging session, and the position reference signal request and the position reference signal response may be processed at an application layer.

In some examples of the method, apparatuses, and non-transitory computer-readable medium described herein, the sidelink ranging session includes a sidelink physical layer ranging session, and the position reference signal request and the position reference signal response may be processed at a sidelink physical layer.

In some examples of the method, apparatuses, and non-transitory computer-readable medium described herein, the sidelink ranging session includes a radio resource control layer ranging session, and the position reference signal request and the position reference signal response may be processed at a radio resource control layer.

In some examples of the method, apparatuses, and non-transitory computer-readable medium described herein, the group sidelink communication request includes a PC5 sidelink message and the sidelink ranging service identifier includes a V2X service identifier.

DETAILED DESCRIPTION

Figure 1:
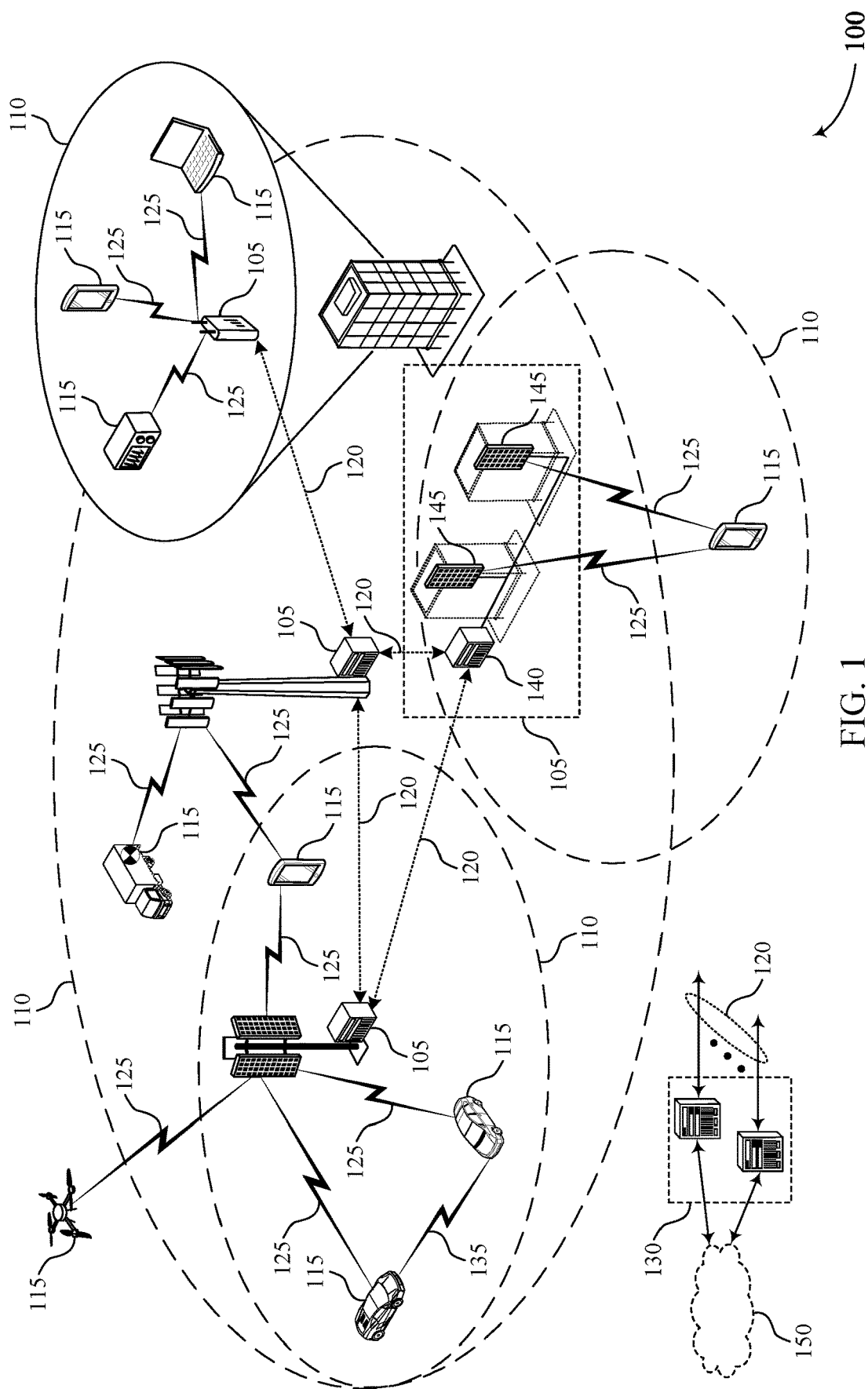
FIG. 1 illustrates an example of a wireless communications system that supports sidelink-based positioning using sidelink signaling in accordance with aspects of the present disclosure.

A wireless communications system may support both access links and sidelinks for communications between one or more communication devices. An access link may refer to a communication link between a UE and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and one or more other UEs within a coverage area. In some examples, the coverage area may include the group of UEs (e.g., a coverage area provided by a base station, a coverage area outside of the coverage area provided by the base station, or a combination thereof). One or more of the UEs in the group of UEs may initiate sidelink communications with other UEs in the group of UEs. In some wireless communications systems, one or more wireless communications devices (e.g., user equipment (UE), base station, etc.) may initiate in sidelink-based ranging techniques which enable an initiator UE to determine a relative distance and absolute position of the one or more wireless devices (e.g., target UEs). In some examples, wireless communications devices may use sidelink-based ranging positioning techniques to enhance range and position accuracy. The sidelink-based ranging may function via a three-way handshake for session establishment (e.g., PRSrequest, PRSresponse, and PRSconfirmation), followed by an exchange of wideband position reference signals (PRSs), and concludes with a messaging (postPRS) to exchange positioning measurements based on the multiple PRS transmissions.

According to one or more aspects of the present disclosure, wireless communications devices may use a sidelink connection to initiate sidelink-based ranging with multiple target wireless communications devices. For example, an initiator UE may broadcast, via a sidelink connection to a set of target UEs, a sidelink ranging service identifier for sidelink-based ranging. The initiator UE and the target UEs may then perform a ranging session at an application-layer, a Radio Resource Control (RRC) layer, or at a lower layer, such as the MAC layer. In accordance with the techniques described herein, one or more wireless devices may perform sidelink-based ranging by using a group sidelink communication request that includes a sidelink ranging service identifier. Additionally or alternatively, the group sidelink communication request may include a broadcast identifier or a groupcast identifier. For example, a group of UEs may perform a sidelink-based ranging establishment over new radio (NR), followed by ranging session parameters and ranging session measurements exchanged at the application-layer or an RRC layer. In some examples, the PRS exchange may be concluded with a measurement message exchange (e.g., postPRS) in which the one or more wireless devices provide information regarding relative positioning. For example, each UE participating in the sidelink-based ranging may calculate a round trip time (RTT) from the measurements received during the postPRS procedure.

UEs supporting sidelink-based positioning in sidelink communications systems may utilize the techniques described herein to experience power savings and extended battery life while ensuring reliable and efficient communications in the group of UEs. Particular aspects of the subject matter described in this disclosure may be implemented to support high reliability and low latency communications, among other examples. The described techniques may thus include features for improvements to power consumption, spectral efficiency, higher data rates and, in some examples, may promote efficiency for high reliability and low latency operations, among other benefits.

Aspects of the disclosure are initially described in the context of wireless communications systems. For example, aspects of the disclosure relate to application of PC5-S and application-layer messages and parameters used in over-the-air (OTA) sidelink-based ranging session establishment and sidelink-based ranging measurement result exchange, and correspond information exchange formats (e.g., information elements). Aspects of the disclosure are further described in the context of process flows. Aspects of the disclosure are further illustrated by and described with reference to apparatus diagrams, system diagrams, and flowcharts that relate to sidelink-based positioning using sidelink signaling.

FIG. 1 illustrates an example of a wireless communications system 100 that supports sidelink-based positioning using sidelink signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

An initiator UE 115 may broadcast, via a sidelink connection to a set of target UEs 115, a group sidelink communication request that includes a sidelink ranging service identifier. The group sidelink communication request may further include a broadcast identifier or a groupcast identifier. In some examples, the initiator UE 115 may transmit a broadcast position reference signal message or a groupcast position reference signal message including the broadcast identifier or the groupcast identifier. The initiator UE 115 may establish, via the sidelink connection, a set of unicast sidelink sessions with the set of target UEs 115. The initiator UE 115 may then transmit, via the sidelink connection, a set of position reference signal requests via the set of unicast sidelink sessions to initiate a set of sidelink ranging sessions. In some examples, the initiator UE 115 may receive, via the sidelink connection, a set of position reference signal responses from the set of target UEs 115 during each of the plurality of sidelink ranging sessions.

Figure 2:
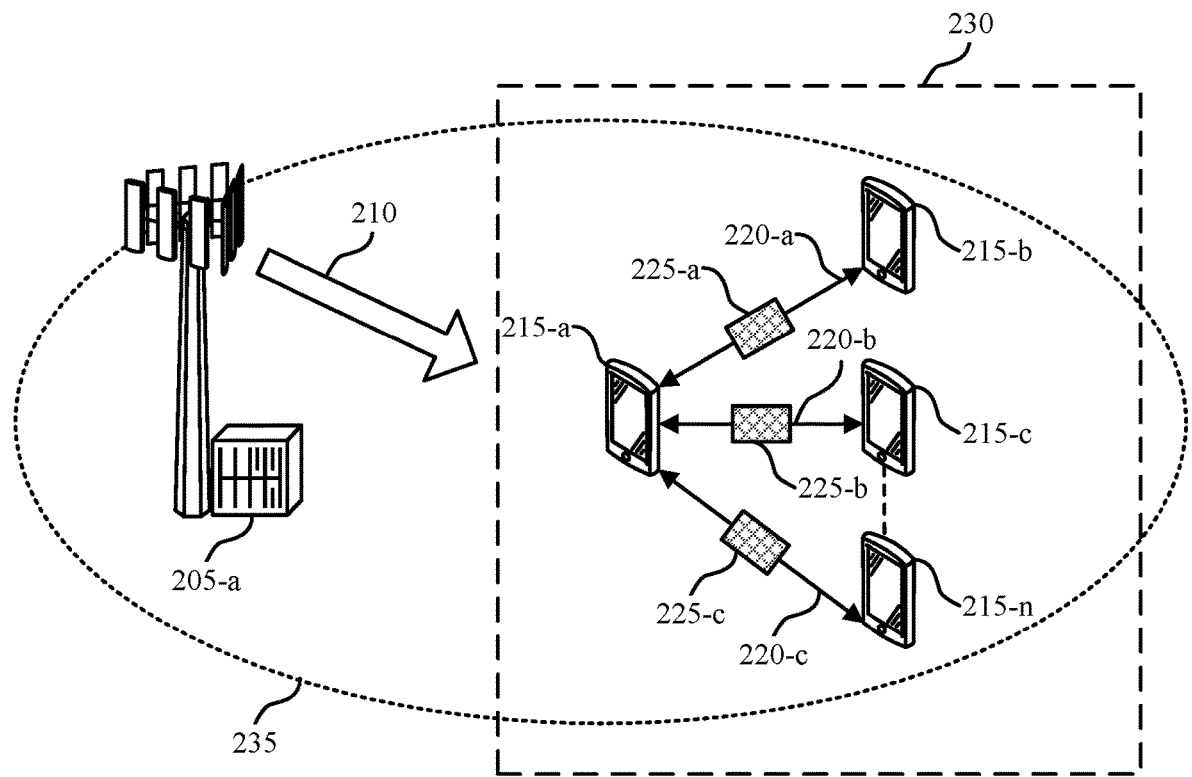
FIG. 2 illustrates an example of a wireless communications system in accordance with aspects of the present disclosure.

FIG. 2 illustrates an example of a wireless communications system 200 that supports sidelink-based positioning using sidelink signaling in accordance with aspects of the present disclosure. In some examples, the wireless communications system 200 may implement aspects of wireless communications system 100. The wireless communications system 200 includes a base station 205, which may be an example of a base station 105 as depicted in the example of FIG. 1, a geographic coverage area 235 which may be an example of a geographic coverage area 110 as depicted in the example of FIG. 1, and one or more UEs 215, which may be examples of UEs 115 as depicted in the example of FIG. 1.

In some cases, the wireless communications system 200 may utilize control signaling to schedule resources for UEs 215 to perform sidelink communications. Additionally or alternatively, the UEs 215 in the wireless communications system 200 may utilize shared information to enhance scheduling, inter-UE coordination, and communications flexibility. In some examples, the group of UEs 215 may communicate with each other (e.g., within a V2X system, a D2D system, and the like) and may employ sidelink transmissions to save power, reduce latency, and ensure reliable communications.

The wireless communications system 200 may support access link and sidelink communications between one or more communication devices. An access link may refer to a communication link between a UE 215 (e.g., UE 215-a, UE 215-b, UE 215-c, etc.) and the base station 205. A sidelink may refer to any communication link between similar wireless devices (e.g., a communication link between UEs 215, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE 215 to one or more other UEs 215.

Base station 205 may communicate with one or more UEs 215 which may be included within a UE group 230 (e.g., UE 215-a through UE 215-n). For example, base station 105-a may transmit control information (via communication link 210) to the UE 215-a, the UE 215-b, the UE 215-c, or any combination thereof. In some examples, the base station 105-a may configure sidelink communication resources for the group of UEs using a configuration message (e.g., semi-persistent scheduling configuration message). For example, the base station 205-a may communicate control signaling via communication link 210 indicating a resource allocation for one or more UEs 215 included in the UE group 230 which may be used for sidelink based communications.

As depicted in the example of FIG. 2, the UEs 215 included in the UE group 230 may communicate with each other (or with another group of UEs 215) over sidelink communications 220 (e.g., using a peer-to-peer (P2P) or D2D protocol). In some cases, the UEs 215 in the UE group 230 may establish the sidelink communications via sidelink communication links 220 to one or more other UEs 215 in the UE group 230. In some examples, sidelink communications may support communications within a UE group 230. For instance, sidelink communications may include communications between a UE 215 and other UEs 215 within a coverage area including the group of UEs (e.g., a coverage area provided by a base station, a coverage area outside of the coverage area provided by the base station, or a combination thereof). One or more of the UEs 215 in the group of UEs 215 may initiate sidelink communications with other UEs in the UE group 230. The UEs 215 may utilize sidelink communications to perform sidelink-based ranging techniques which may determine relative distance and absolute position for one or more of the UEs 215. Thus, sidelink-based ranging may enable determination of UE relative distance and absolute position. In some examples, UEs 215 may use sidelink-based ranging positioning techniques in cases in which other wireless positioning methods (e.g., Global Navigation Satellite System (GNSS)) are unavailable (e.g., due to presence of tunnels, urban canyons, etc.). Sidelink-based ranging may also enhance range and position accuracy.

In some instances, the UEs 215 may perform sidelink-based ranging using a three-way handshake for session establishment, followed by exchange of PRSs, and concluded by messaging to exchange measurements based on PRS transmission and receipt from peer UEs. As depicted in the example of FIG. 2, the UE 215-a may act as an initiator UE and may thus initiate a three-way messaging handshake used to establish conditions for transmission with the other UEs 215 in the UE group 230 (e.g., UE 215-b through UE 215-n) of PRSs 225. For example, the initiator UE 215-a may broadcast a request message (e.g., PRSrequest) which may be directed to one or more target UEs 215 (e.g., UE 215-b through UE 215-n). Each target UE 215 listed in the request message may transmit back a unicast response message (e.g., PRSresponse) to the initiator UE 215-*a*. The initiator UE 215-*a* may respond back individually to each UE 215 (e.g., each UE transmitting the PRS response message) using a unicast confirmation message (e.g., PRSconfirmation). By way of example, a three-way messaging handshake may be followed with each UE 215 participating in the sidelink-based ranging session (e.g., UE 215-*a* through UE 215-*n*) broadcasting PRS 225 messages to the other UEs 215. Subsequent to handshaking, UEs may transmit (broadcast) PRS signals, and may exchange post-PRS with measurements of the received PRS signals. That is, the PRS message exchange between the initiator UE 215-*a* and the one or more target UEs 215 may be concluded with a measurement message exchange (e.g., postPRS) in which the UEs 215 may broadcast positioning related information to the other UEs 215 in UE group 230. For example, if there were N UEs 215 participating in the sidelink-based ranging, each of the participating UEs 215 may broadcast N−1 measurement results to the other UEs 215 (UEs other than the broadcasting UE) during a postPRS procedure.

In some examples, each UE 215 participating in the sidelink-based ranging may calculate an inter-UE 215 RTT from the N−1 measurements received during the postPRS. For example, a first UE (e.g., UE 215-*a*) may calculate the RTT between itself and a second UE (e.g., UE 215-*b*) by determining the transmission times and reception times of the multiple wideband PRS messages 225 that were communicated between the first UE (e.g., UE 215-*a*) and the second UE (e.g., UE 215-*b*). Each UE 215 may report both a measured RTT and its location (if known) to all other participating UEs 215. In some cases, a UE 215 may have limited or inaccurate knowledge of their position which may yield an inter-UE range. For example, if the UE 215-*a* has limited or inaccurate knowledge of its position, it may use the measurements acquired form the other UEs 215 during the sidelink-based ranging session to determine a relative distance of the UE 215-*a* from the other UEs 215 that participated in the sidelink-based ranging session. In some cases, a UE 215 may have accurate knowledge of their position which may yield an absolute position. For example, if UE 215-*a* has accurate knowledge of its position, the UE 215-*a* may use the measurements acquired form the other UEs 215 during the sidelink-based ranging session to determine an absolute position.

In particular, however, sidelink-based ranging may include coordination among multiple wireless devices to agree on parameters for transmission of ranging signals and resultant positioning measurements. In some examples, wireless devices supporting 5G new radio (NR) may use a unicast PC5-signaling (PC5-S) protocol to efficiently establish peer-to-peer communication. However, some wireless communications systems do not provide a mechanism for establishing sidelink-based ranging using PC5-S. In some wireless communications systems, wireless devices may establish a sidelink-based ranging session via application-layer signaling. For example, the initiator UE may establish a sidelink ranging procedure with the other UEs in the UE group using application-layer signaling. Using application-layer signaling for accomplishing sidelink-based ranging may incur higher latency than a PC5-S based sidelink ranging session establishment procedure.

By operating in accordance with the techniques disclosed herein, the UEs 215 in the UE group 230 may establish sidelink-based ranging using a unicast PC5-S protocol. For example, the initiator UE 215-*a* may transmit a direct communication request or broadcast a PC5-S message in a licensed intelligent transport system (ITS) band. In some examples, the PC5-S message may include a V2X service identifier field that indicates a sidelink-based ranging session, to the other UEs 215 in the UE group 230. The establishment of the sidelink-based ranging session via PC5-S signaling may be followed by ranging session parameters and ranging session measurements negotiated at the PC-5 S layer, the application-layer or an RRC layer. Aspects depicted herein provide for session establishment to be performed over 5G NR in a unicast operation, with subsequent ranging session parameters and ranging session measurements negotiated and exchanged at the application-layer or RRC layer. In some aspects, the PC5-S session establishment may specify unicast or broadcast communication.

In some implementations, the PC5-S protocol used for sidelink-based ranging initiation may be followed by an application-layer unicast negotiation and sidelink ranging session. For example, the initiator UE 215-*a* may transmit a PC5-S broadcast message to a set of target UEs 215 to establish sidelink ranging followed by transmission of the various PRS messages 225 which are communicated via application-layer unicast signaling. Transmission of the various PRS messages 225 via application-layer unicast signaling is described in more detail herein, including with reference to FIG. 3.

In some implementations, the PC5-S protocol used for sidelink-based ranging initiation may be followed by an application-layer groupcast or broadcast negotiation and sidelink ranging session. In some examples, the initiator UE 215-*a* may transmit a PC5-S broadcast message which may include a broadcast identifier or groupcast identifier to indicate a set of target UEs 215 to establish sidelink ranging. The PC5-S broadcast may be followed by transmission of the various PRS messages 225 which are communicated via application-layer broadcast or groupcast signaling. For example, if the PC5-S establishment message includes a broadcast identifier, then the set of UEs 215 identified on the broadcast identifier may transmit the various PRS messages 225 via application-layer broadcast signaling, and if the PC5-S establishment message includes a groupcast identifier, then the set of UEs 215 identified on the groupcast identifier may transmit the various PRS messages 225 via application-layer groupcast signaling. Transmission of the various PRS messages 225 via application-layer broadcast or groupcast signaling is described in more detail herein, including with reference to FIG. 4.

In some implementations, the PC5-S protocol used for sidelink-based ranging initiation may be followed by a PC5-S unicast negotiation and sidelink ranging session. For example, the initiator UE 215-*a* may transmit a PC5-S broadcast message to a set of target UEs 215 to establish sidelink ranging followed by transmission of the various PRS messages 225 which are communicated via PC5-S unicast signaling. Transmission of the various PRS messages 225 via PC5-S unicast signaling is described in more detail herein, including with reference to FIG. 5.

In some implementations, the PC5-S protocol used for sidelink-based ranging initiation may be followed by a PC5-S broadcast negotiation and sidelink ranging session. For example, the initiator UE 215-*a* may transmit a PC5-S broadcast message to a set of target UEs 215 to establish sidelink ranging followed by transmission of the various PRS messages 225 which are communicated via PC5-S broadcast signaling. Transmission of the various PRS messages 225 via PC5-S broadcast signaling is described in more detail herein, including with reference to FIG. 6.

Figure 3:
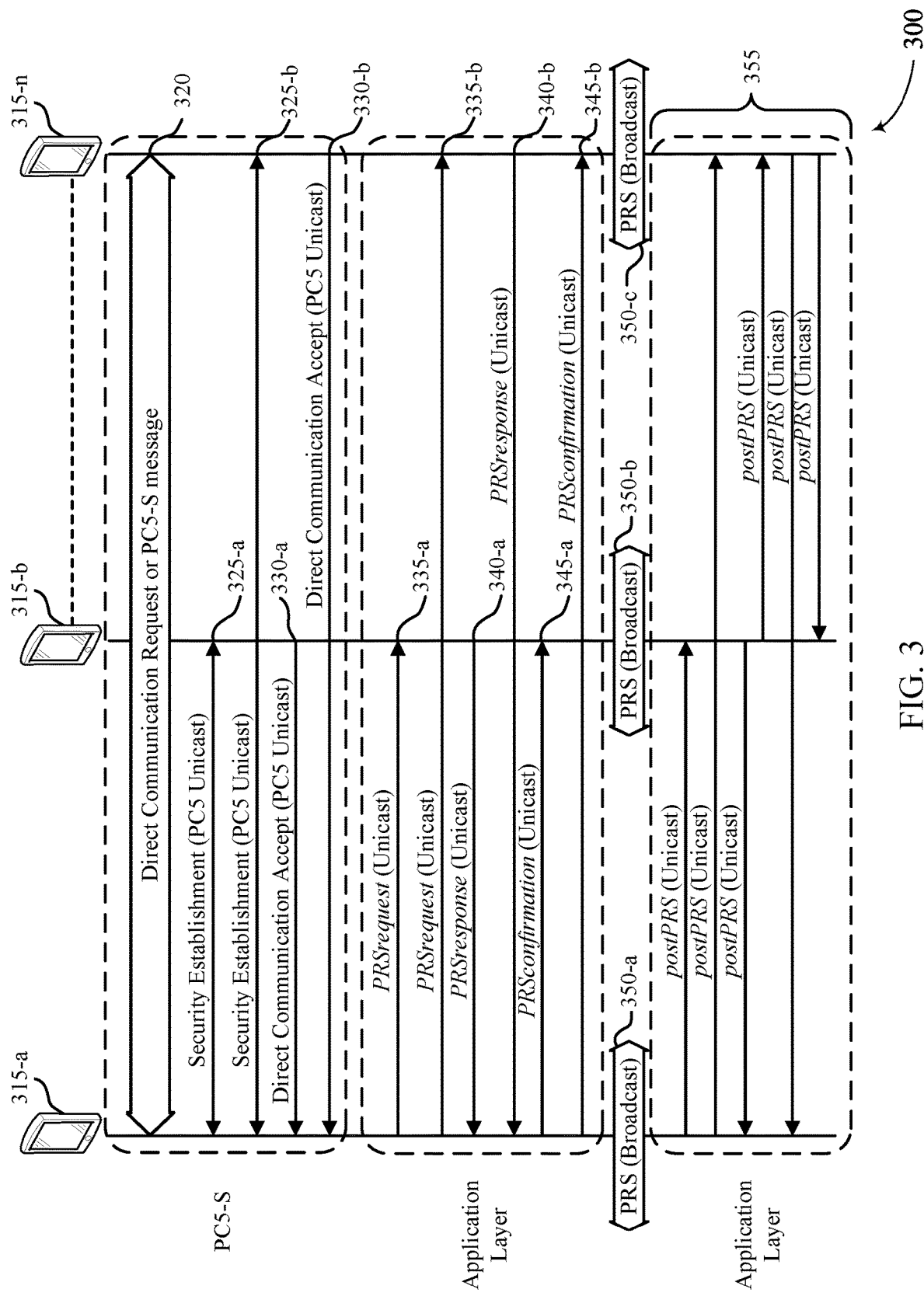
FIG. 3 illustrates an example of a process flow in accordance with aspects of the present disclosure.

FIG. 3 illustrates an example of a process flow 300 that supports sidelink-based positioning using sidelink signaling in accordance with aspects of the present disclosure. In some examples, the process flow 300 may implement aspects of wireless communications system 100 and the wireless communications system 200 described with reference to FIGS. 1 and 2, respectively. For example, the process flow 300 may be based on one or more UEs participating in various sidelink-based ranging techniques. For example, the process flow 300 may depict PC5-S initiation, Application-layer unicast negotiation, where a PC5-S broadcast request is followed by an application layer unicast sidelink ranging exchange. The process flow 300 may be implemented by an initiator UE 315-*a*, and a number of target UEs including the UE 315-*b* though the UE 315-*n* for PC5-S based sidelink ranging initiation and may promote low latency communication and a decrease in signaling overhead, among other benefits. The UE 315-*a*, the UE 315-*b* and the UE 315-*n* may be examples of a UE 115, as described with reference to FIGS. 1 and 2.

In the following description of the process flow 300, the operations between the UE 315-*a* (initiator UE), the UE 315-*b* (target UE), and the UE 315-*n* (target UE) may be transmitted in a different order than the example order shown, or the operations performed by the UE 315-*a*, the UE 315-*b*, and the UE 315-*n* may be performed in different orders or at different times. Some operations may also be omitted from the process flow 300, and other operations may be added to the process flow 300. In addition, while process flow 300 shows processes between the UE 315-*a*, the UE 315-*b*, and the UE 315-*n*, it should be understood that these processes may occur between any number of network devices.

At 320, the initiator UE 315-*a* may transmit (e.g., broadcast), via at least one sidelink connection to one or more target UEs 315 (e.g., UE 315-*b* through UE 315-*n*) a group sidelink communication request that includes a sidelink ranging service identifier. For example, the initiator UE 315-*a* may transmit a direct communication request or a PC5-S message, which may include a service identifier (e.g., sidelink ranging service identifier) initiating a sidelink-based ranging session with the target UEs 315 (e.g., UE 315-*b* through UE 315-*n*). In some cases, the service identifier may be or otherwise include a V2X service identifier. In some examples, the group sidelink communication request may be a broadcast sidelink communication request. For example, the initiator UE 315-*a* may broadcast the PC5-S message which includes the sidelink-based ranging session service identifier.

At 325, the initiator UE 315-*a* may communicate one or more security establishment messages with target UEs 315 (e.g., UE 315-*b* through UE 315-*n*) corresponding to the sidelink ranging service identifier (e.g., establish, via the at least one sidelink connection, a plurality of unicast sidelink sessions with the plurality of target UEs). For example, the initiator UE 315-*a* and each of the target UEs (UE 315-*b* through UE 315-*n*) may establish a security establishment session via PC-5 S unicast message (e.g., unicast sidelink session). In some examples, the initiator UE 315-*a* and target UEs 315 may communicate the security establishment messages via PC5 unicast messages. At 330, the target UEs 315 (e.g., UE 315-*b* through UE 315-*n*) may each transmit a communication acceptance message to the initiator UE 315-*a* which may indicate to the initiator UE 315-*a* that the target UEs 315 accept the sidelink-based ranging session request. In some cases, each target UE 315 may transmit the communication acceptance message via a PC5 unicast message.

At 335, the initiator UE 315-*a* may transmit to the target UEs 315 (e.g., UE 315-*b* through UE 315-*n*), via the at least one sidelink connection, one or more PRS requests (e.g., PRSrequest) via one or more unicast sidelink sessions to initiate one or more sidelink ranging sessions. In some cases, the one or more sidelink ranging sessions may include one or more application layer ranging sessions which may be transmitted using an ITS band (e.g., a licensed band). In some examples, the one or more PRS requests may be processed on an application layer.

At 340, the initiator UE 315-*a* may receive, via the at least one sidelink connection, one or more PRS responses (e.g., PRSresponse) from the one or more target UEs 315 (e.g., UE 315-*b* through UE 315-*n*) during each of the one or more of unicast sidelink ranging sessions. In some examples, the one or more PRS responses may be processed at an application layer. At 345, the initiator UE 315-*a* may transmit to the target UEs 315 (e.g., UE 315-*b* through UE 315-*n*), via the at least one sidelink connection, one or more PRS confirmation messages (e.g., PRSconfirmation) via one or more unicast sidelink sessions in response to the one or more received PRS responses.

At 350, each UE 315 participating in the sidelink-based ranging session (e.g., UE 315-*a* through UE 315-*n*) may perform a PRS broadcast to all other UEs 315 participating in the sidelink-based ranging session. For example, the initiator UE 315-*a* may broadcast the PRS message to other UEs 315 participating in the sidelink-based ranging session (e.g., UE 315-*b* through the UE 315-*n*) and vice versa for all other UEs 315 participating in the sidelink-based ranging session. In some examples, each UE 315 may broadcast the PRS message in a non-ITS band (e.g., an unlicensed band).

At 355, the UEs 315 participating in the sidelink-based ranging session (e.g., UE 315-*a* through UE 315-*n*) may use an ITS band (e.g., a licensed band) to exchange measurements associated with position (e.g., postPRS) via unicast messaging that may be processed at an application layer. For example, if there are N UEs 315 that are participating in the sidelink-based ranging session, then each UE 315 may transmit N−1 postPRS unicast messages to the other UEs 315 that are participating in the sidelink-based ranging session. In one example, the initiator UE 315-*a* may transmit a unicast message specific to each target UE 315 (e.g., UE 315-*b* through 315-*n*) with position measurements for the receiving UE 315. The UE 315-*a* may also receive a unicast message from every target UE 315 (e.g., UE 315-*b* through 315-*n*) with measurements regarding position relative to UE 315-*a*.

As such, each UE 315 participating in the sidelink-based ranging may calculate an inter-UE 315 RTT from the N−1 measurements received during postPRS. For example, the initiator UE 315-*a* may calculate the RTT between itself and the target UE 315-*b* by determining the transmission times and reception times for the multiple postPRS unicast messages communicated between the UEs 315. In some cases, each UE 315 may report both a measured RTT and its location (if known) to other participating UEs 315.

Figure 4:
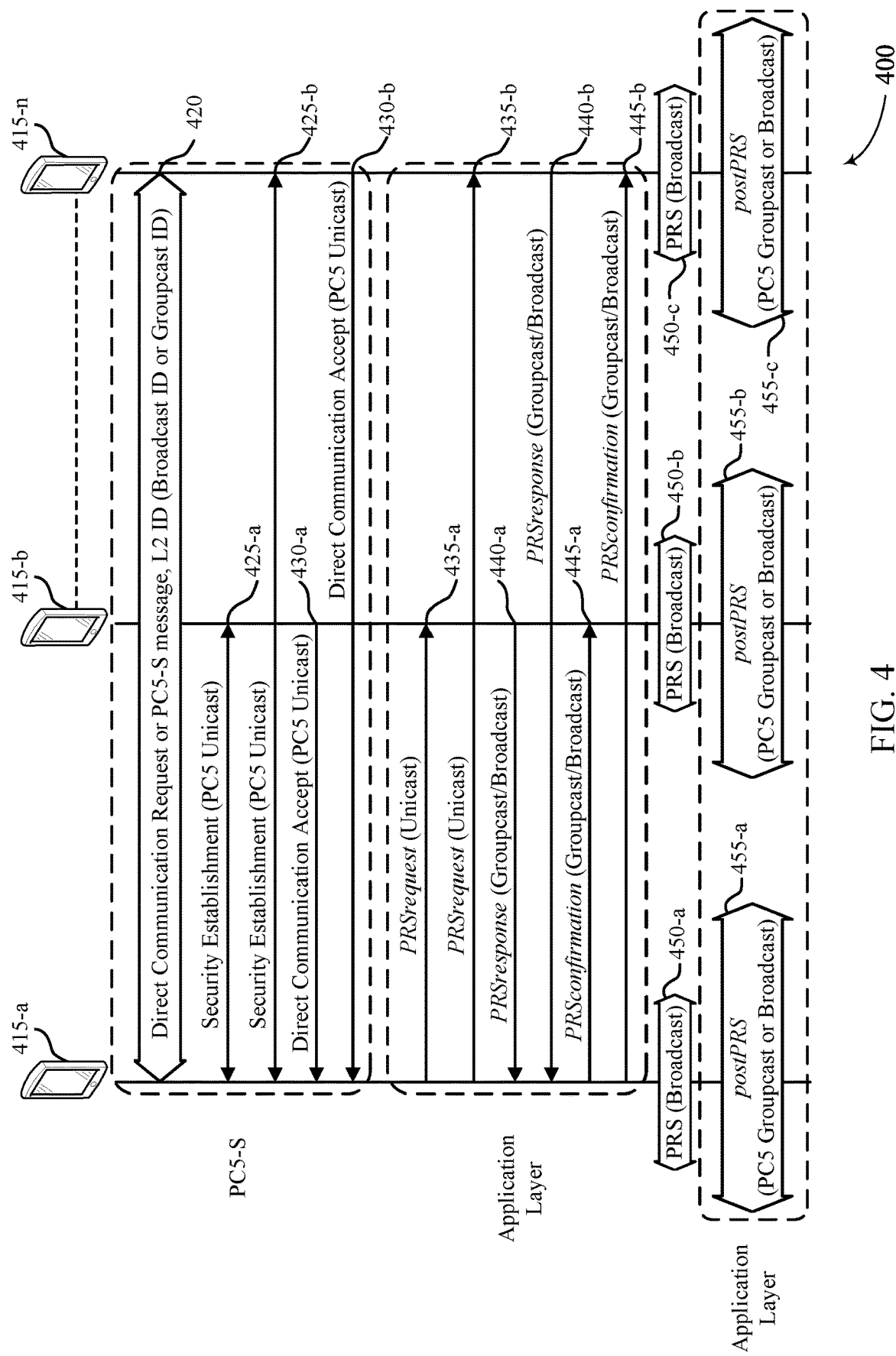
FIG. 4 illustrates an example of a process flow in accordance with aspects of the present disclosure.

FIG. 4 illustrates an example of a process flow 400 that supports sidelink-based positioning using sidelink signaling in accordance with aspects of the present disclosure. In some examples, the process flow 400 may implement aspects of wireless communications system 100 and the wireless communications system 200 described with reference to FIGS. 1 and 2, respectively. For example, the process flow 400 may be based on one or more UEs participating in various sidelink-based ranging techniques. For example, the process flow 400 may depict PC5-S initiation, Application-layer groupcast/broadcast negotiation, where a PC5-S broadcast request is followed by an application layer groupcast/broadcast sidelink ranging exchange. The process flow 400 may be implemented by an initiator UE 415-*a*, and a number of target UEs including the UE 415-*b* though the UE 415-*n* for PC5-S based sidelink ranging establishment and may promote low latency communication and a decrease in signaling overhead, among other benefits. The UE 415-*a*, the UE 415-*b*, and the UE 415-*n* may be examples of a UE 115, as described with reference to FIGS. 1, 2, and 3.

In the following description of the process flow 400, the operations between the UE 415-*a* (initiator UE), the UE 415-*b* (target UE), and the UE 415-*n* (target UE) may be transmitted in a different order than the example order shown, or the operations performed by the UE 415-*a*, the UE 415-*b*, and the UE 415-*n* may be performed in different orders or at different times. Some operations may also be omitted from the process flow 400, and other operations may be added to the process flow 400. In addition, while process flow 400 shows processes between the UE 415-*a*, the UE 415-*b*, and the UE 415-*n*, it should be understood that these processes may occur between any number of network devices.

At 420, the initiator UE 415-*a* may transmit (e.g., broadcast), via at least one sidelink connection to one or more target UEs 415 (e.g., UE 415-*b* through UE 415-*n*), a group sidelink communication request that includes a sidelink ranging service identifier. For example, the initiator UE 415-*a* may transmit a direct communication request or a PC5-S message, which may include a service identifier (e.g., sidelink ranging service identifier) initiating a sidelink-based ranging session with the target UEs 415 (e.g., UE 415-*b* through UE 415-*n*). In some cases, the service identifier may be or otherwise include a V2X service identifier. In some examples, the group sidelink communication request may be a broadcast sidelink communication request. For example, the initiator UE 415-*a* may broadcast the PC5-S message which includes the sidelink-based ranging session service identifier. In some cases, the group sidelink communication request may include a destination L2 identifier (ID) (e.g., field to specify a broadcast identifier or a groupcast identifier for an application-layer PostPRS message) which may identify a group of UEs 415 that the group sidelink communication request is intended for. For example, the initiator UE 415-*a* may include a broadcast identifier or a groupcast identifier in the group sidelink communication request to identify one or more target UEs 415 (e.g., UE 415-*b* through UE 415-*n*) with which the initiator UE 415-*a* intends to perform a sidelink-based ranging session.

At 425, the initiator UE 415-*a* may communicate one or more security establishment messages with target UEs 415 (e.g., UE 415-*b* through UE 415-*n*) corresponding to the sidelink ranging service identifier (e.g., establish, via the at least one sidelink connection, a plurality of unicast sidelink sessions with the plurality of target UEs). For example, the initiator UE 415-*a* and each of the target UEs (UE 415-*b* through UE 415-*n*) may establish a security establishment session via PC5-S unicast message (e.g., unicast sidelink session). For example, the initiator UE 415-*a* and the target UE 415-*b* may establish a security establishment session at 425-*a* and the initiator UE 415-*a* and the target UE 415-*n* may establish a security establishment session at 425-*b*. In some examples, the initiator UE 415-*a* and target UEs 415 may communicate the security establishment messages via PC5 unicast messages.

At 430, the target UEs 415 (e.g., UE 415-*b* through UE 415-*n*) may each transmit a communication acceptance message to the initiator UE 415-*a* which may indicate to the initiator UE 415-*a* that the target UEs 415 accept the sidelink-based ranging session request. In some cases, each target UE 415 may transmit the communication acceptance message via a PC5 unicast message.

At 435, the initiator UE 415-*a* may transmit to the target UEs 415 (e.g., UE 415-*b* through UE 415-*n*), via the at least one sidelink connection, one or more PRS requests (e.g., PRSrequest) via one or more unicast sidelink sessions to initiate one or more sidelink ranging sessions. In some cases, the one or more sidelink ranging sessions may include one or more application layer ranging sessions which may be transmitted using an ITS band (e.g., a licensed band). In some examples, the one or more PRS requests may be processed on an application layer.

At 440, the initiator UE 415-*a* may receive, via the at least one sidelink connection, one or more PRS responses (e.g., PRSresponse) from the one or more target UEs 415 (e.g., UE 415-*b* through UE 415-*n*) via one or more broadcast or groupcast sidelink ranging sessions. For example, if the one or more target UEs 415 (e.g., UE 415-*b* through UE 415-*n*) received a broadcast identifier from the target UE 415-*a* during the group sidelink communication request, the target UEs 415 may broadcast a PRSresponse that corresponds to the broadcast identifier. Additionally or alternatively, if the one or more target UEs 415 received a groupcast identifier from the target UE 415-*a* during the group sidelink communication request, the target UEs 415 may groupcast a PRSresponse that corresponds to the groupcast identifier. In some examples, the one or more PRS responses may be processed at an application layer. At 445, the initiator UE 415-*a* may transmit to the target UEs 415 (e.g., UE 415-*b* through UE 415-*n*), via the at least one sidelink connection, one or more PRS confirmation messages (e.g., PRSconfirmation). The initiator UE 415-*a* may transmit the one or more PRSconfirmation messages via one or more broadcast or groupcast sidelink sessions that include either the broadcast identifier or the groupcast identifier that was included in the group sidelink communication request in response to the one or more received PRSresponse messages.

At 450, each UE 415 participating in the sidelink-based ranging session (e.g., UE 415-*a* through UE 415-*n*) may perform a PRS broadcast to all other UEs 415 participating in the sidelink-based ranging session. For example, the initiator UE 415-*a* may broadcast the PRS message to target UEs 415 participating in the sidelink-based ranging session (e.g., UE 415-*b* through the UE 415-*n*) and vice versa for all other UEs 415 participating in the sidelink-based ranging session. In some examples, each UE 415 may broadcast the PRS message in a non-ITS band (e.g., an unlicensed band).

At 455, the UEs 415 participating in the sidelink-based ranging session (e.g., UE 415-*a* through UE 415-*n*) may return to an ITS band (e.g., a licensed band) and may exchange measurements associated with position (e.g., post-PRS) via broadcast or groupcast messaging that may be processed at an application layer. For example, if there are N UEs 415 that are participating in the sidelink-based ranging session, then each UE 415 may transmit position based measurements for the other N−1 UEs 415 participating in the sidelink-based ranging session over the postPRS broadcast or groupcast message. In one example, the initiator UE 415-*a* may transmit a broadcast or groupcast post-PRS message that includes either the broadcast identifier or the groupcast identifier that was included in the group sidelink communication request and includes position based measurements specific to each target UE 415 (e.g., UE 415-*b* through 415-*n*). The UE 415-*a* may also receive a broadcast or groupcast message that is the same as or corresponds to (e.g., is a function of) the broadcast identifier or groupcast identifier, received in the group sidelink communication request, from every target UE 415 (e.g., UE 415-*b* through 415-*n*) with measurements regarding position relative to the initiator UE 415-*a*. In some examples, Application-Layer SL ranging session messaging occurring in an ITS band may include a groupcast identifier or a broadcast identifier that is the same as or is a function of Destination L2 ID specified by initiator UE in PC5-S Direct Communication Request or Application-layer PRSrequest, PRSconfirmation, or both.

As such, each UE 415 participating in the sidelink-based ranging may calculate an inter-UE 415 RTT from the N−1 measurements received during postPRS. For example, the initiator UE 415-*a* may calculate the RTT between itself and the target UE 415-*b* by determining the transmission times and reception times for the multiple postPRS broadcast or groupcast messages communicated between the UEs 415. In some cases, each UE 415 may report both a measured RTT and its location (if known) to other participating UEs 415.

Figure 5:
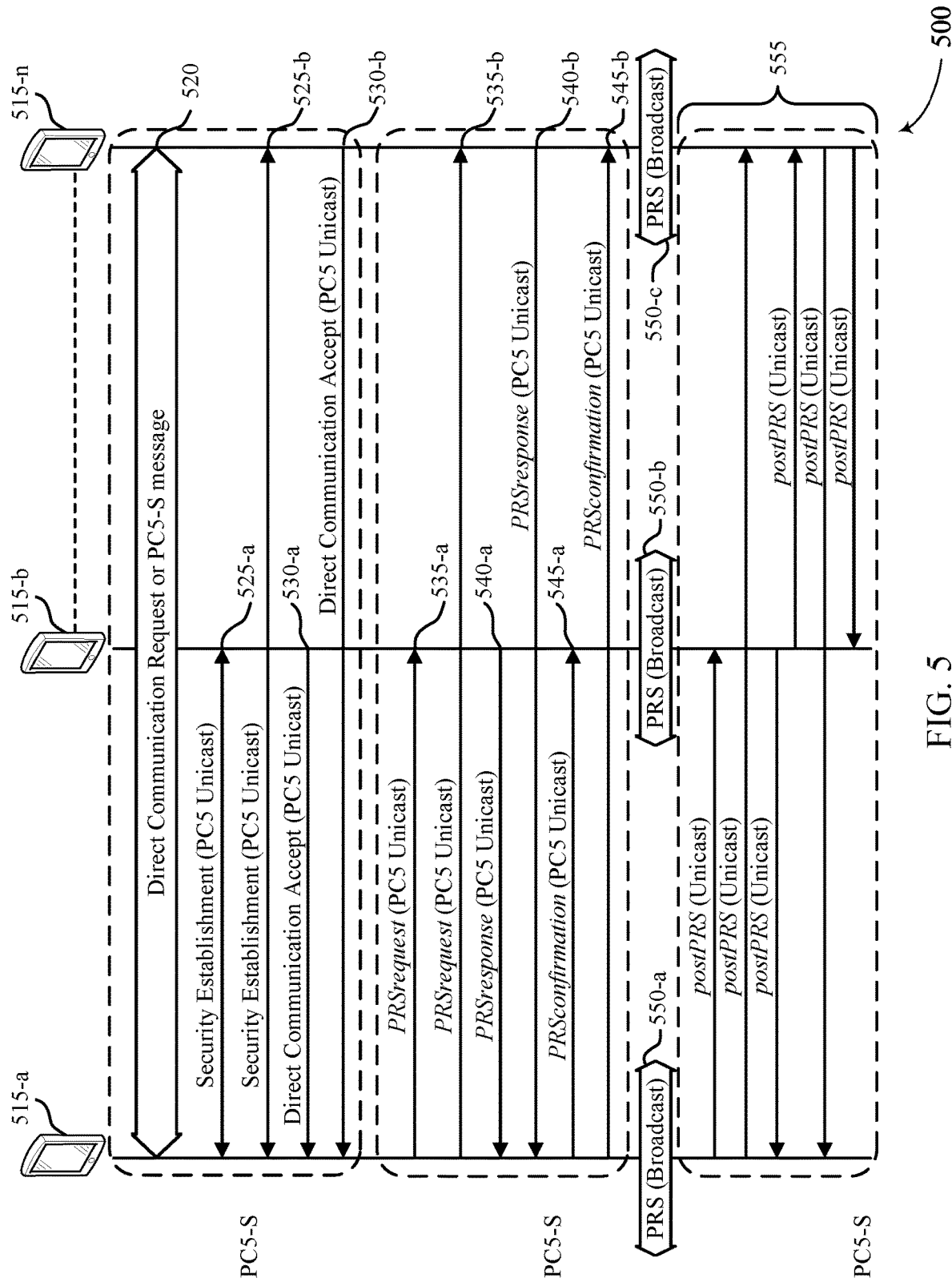
FIG. 5 illustrates an example of a process flow in accordance with aspects of the present disclosure.

FIG. 5 illustrates an example of a process flow 500 that supports sidelink-based positioning using sidelink signaling in accordance with aspects of the present disclosure. In some examples, the process flow 500 may implement aspects of wireless communications system 100 and the wireless communications system 200 described with reference to FIGS. 1 and 2, respectively. For example, the process flow 500 may be based on one or more UEs participating in various sidelink-based ranging techniques. For example, the process flow 500 may depict PC5-S initiation, PC5-S unicast negotiation, where a PC5-S broadcast request is followed by a PC5-S unicast sidelink ranging exchange. The process flow 500 may be implemented by an initiator UE 515-*a*, and a number of target UEs including the UE 515-*b* though the UE 515-*n* for PC5-S based sidelink ranging establishment and may promote low latency communication and a decrease in signaling overhead, among other benefits. The UE 515-*a*, the UE 515-*b*, and the UE 515-*n* may be examples of a UE 115, as described with reference to FIGS. 1-4.

In the following description of the process flow 500, the operations between the UE 515-*a* (initiator UE), the UE 515-*b* (target UE), and the UE 515-*n* (target UE) may be transmitted in a different order than the example order shown, or the operations performed by the UE 515-*a*, the UE 515-*b*, and the UE 515-*n* may be performed in different orders or at different times. Some operations may also be omitted from the process flow 500, and other operations may be added to the process flow 500. In addition, while process flow 500 shows processes between the UE 515-*a*, the UE 515-*b*, and the UE 515-*n*, it should be understood that these processes may occur between any number of network devices.

At 520, the initiator UE 515-*a* may transmit (e.g., broadcast), via at least one sidelink connection to one or more target UEs 515 (e.g., UE 515-*b* through UE 515-*n*), a group sidelink communication request that includes a sidelink ranging service identifier. For example, the initiator UE 515-*a* may transmit a direct communication request or a PC5-S message, which may include a service identifier (e.g., sidelink ranging service identifier) initiating a sidelink-based ranging session with the target UEs 515 (e.g., UE 515-*b* through UE 515-*n*). In some cases, the service identifier may be or otherwise include a V2X service identifier. For example, the initiator UE 515-*a* may broadcast the PC5-S message which includes the sidelink-based ranging session service identifier.

At 525, the initiator UE 515-*a* may communicate one or more security establishment messages with target UEs 515 (e.g., UE 515-*b* through UE 515-*n*) corresponding to the sidelink ranging service identifier (e.g., establish, via the at least one sidelink connection, a plurality of unicast sidelink sessions with the plurality of target UEs). For example, the initiator UE 515-*a* and each of the target UEs (UE 515-*b* through UE 515-*n*) may establish a security establishment session via PC-5 S unicast message (e.g., unicast sidelink session). In some examples, the initiator UE 515-*a* and target UEs 515 may communicate the security establishment messages via PC5 unicast messages. At 530, the target UEs 515 (e.g., UE 515-*b* through UE 515-*n*) may each transmit a communication acceptance message to the initiator UE 515-*a* which may indicate to the initiator UE 515-*a* that the target UEs 515 accept the sidelink-based ranging session request. In some cases, each target UE 515 may transmit the communication acceptance message via a PC5 unicast message.

At 535, the initiator UE 515-*a* may transmit to the target UEs 515 (e.g., UE 515-*b* through UE 515-*n*), via the sidelink connection, one or more PRS requests (e.g., PRSrequest) via one or more unicast sidelink sessions to initiate one or more sidelink ranging sessions. In some cases, the one or more sidelink ranging sessions may include one or more physical layer ranging sessions (e.g., PC5) which may be transmitted using an ITS band (e.g., a licensed band). In some examples, the one or more PRS requests may be processed on a sidelink physical layer. In some other cases, the one or more sidelink ranging sessions may include one or more RRC layer ranging sessions which may be transmitted using an ITS band (e.g., a licensed band). In some examples, the one or more PRS requests may be processed on an RRC layer.

At 540, the initiator UE 515-*a* may receive, via the at least one sidelink connection, one or more PRS responses (e.g., PRSresponse) from the one or more target UEs 515 (e.g., UE 515-*b* through UE 515-*n*) during each of the one or more of unicast sidelink ranging sessions. In some examples, the one or more PRS responses may be processed at either a physical layer. At 545, the initiator UE 515-*a* may transmit to the target UEs 515 (e.g., UE 515-*b* through UE 515-*n*), via the at least one sidelink connection, one or more PRS confirmation messages (e.g., PRSconfirmation) via one or more unicast sidelink sessions in response to the one or more received PRS responses.

At 550, each UE 515 participating in the sidelink-based ranging session (e.g., UE 515-*a* through UE 515-*n*) may perform a PRS broadcast to all other UEs 515 participating in the sidelink-based ranging session. For example, the initiator UE 515-*a* may broadcast the PRS message to other UEs 515 participating in the sidelink-based ranging session (e.g., UE 515-*b* through the UE 515-*n*) and vice versa for all other UEs 515 participating in the sidelink-based ranging session. In some examples, each UE 515 may broadcast the PRS message in a non-ITS band (e.g., an unlicensed band).

At 555, the UEs 515 participating in the sidelink-based ranging session (e.g., UE 515-*a* through UE 515-*n*) may use an ITS band (e.g., a licensed band) to exchange measurements associated with position (e.g., postPRS) via unicast messaging that may be processed at either a physical layer or an RRC layer. For example, if there are NUEs 515 that are participating in the sidelink-based ranging session, then each UE 515 may transmit N−1 postPRS unicast messages to the other UEs 515 that are participating in the sidelink-based ranging session. In one example, the initiator UE 515-*a* may transmit a unicast message specific to each target UE 515 (e.g., UE 515-*b* through 515-*n*) with position measurements for the receiving UE 515. The UE 515-*a* may also receive a unicast message from every target UE 515 (e.g., UE 515-*b* through 515-*n*) with measurements regarding position relative to UE 515-*a*.

As such, each UE 515 participating in the sidelink-based ranging may calculate an inter-UE 515 RTT from the N−1 measurements received during postPRS. For example, the initiator UE 515-*a* may calculate the RTT between itself and the target UE 515-*b* by determining the transmission times and reception times for the multiple postPRS unicast messages communicated between the UEs 515. In some cases, each UE 515 may report both a measured RTT and its location (if known) to other participating UEs 515

Figure 6:
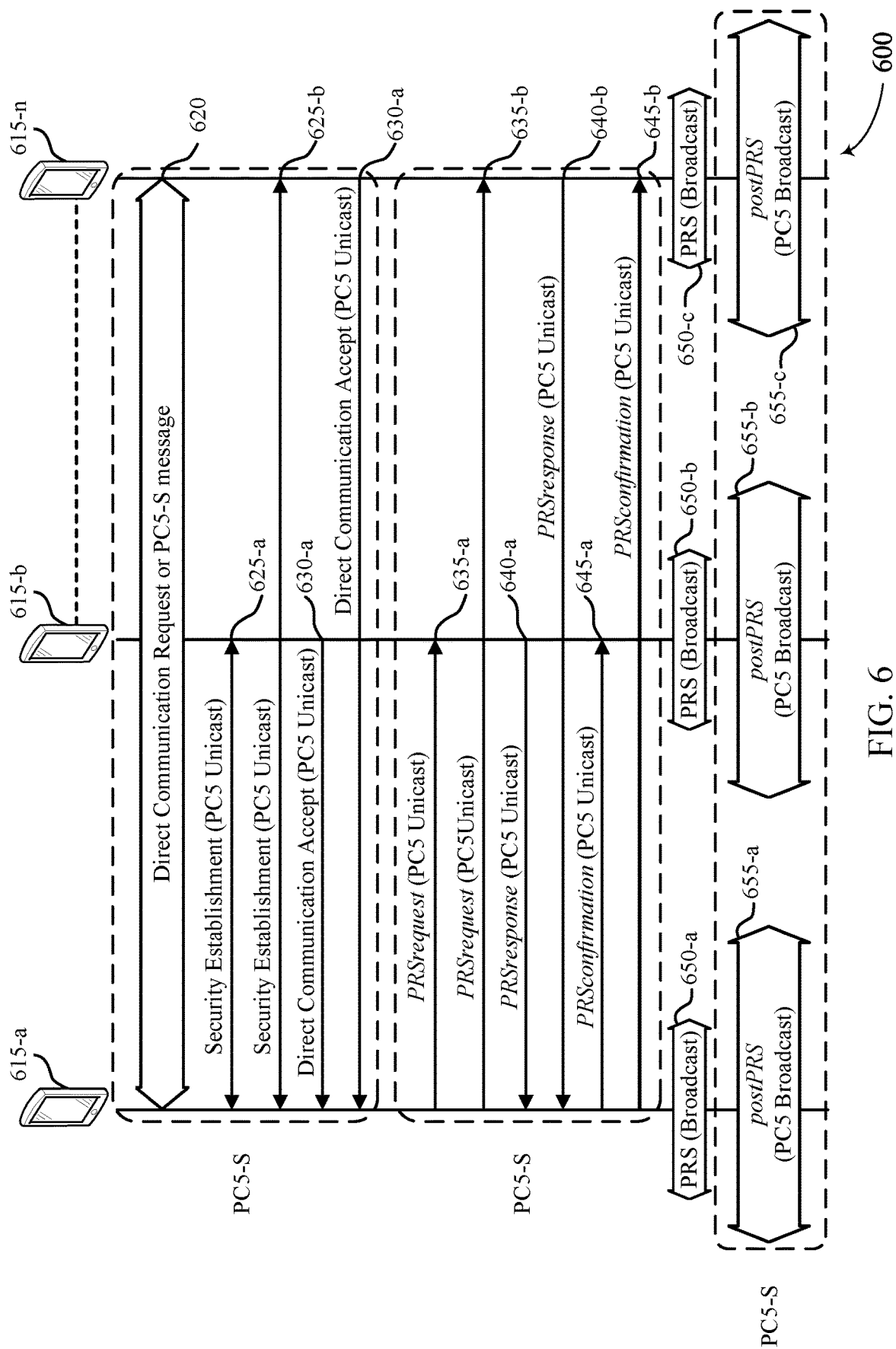
FIG. 6 illustrates an example of a process flow in accordance with aspects of the present disclosure.

FIG. 6 illustrates an example of a process flow 600 that supports sidelink-based positioning using sidelink signaling in accordance with aspects of the present disclosure. In some examples, the process flow 600 may implement aspects of wireless communications system 100 and the wireless communications system 200 described with reference to FIGS. 1 and 2, respectively. For example, the process flow 600 may be based on one or more UEs participating in various sidelink-based ranging techniques. For example, the process flow 600 may depict PC5-S initiation, PC5-S broadcast negotiation, where a PC5-S broadcast request is followed by PC5-S broadcast sidelink ranging messages. The process flow 600 may be implemented by an initiator UE 615-*a*, and a number of target UEs including the UE 615-*b* though the UE 615-*n* for PC5-S based sidelink ranging establishment and may promote low latency communication and a decrease in signaling overhead, among other benefits. The UE 615-*a*, the UE 615-*b*, and the UE 615-*n* may be examples of a UE 115, as described with reference to FIGS. 1-5.

In the following description of the process flow 600, the operations between the UE 615-*a* (initiator UE), the UE 615-*b* (target UE), and the UE 615-*n* (target UE) may be transmitted in a different order than the example order shown, or the operations performed by the UE 615-*a*, the UE 615-*b*, and the UE 615-*n* may be performed in different orders or at different times. Some operations may also be omitted from the process flow 600, and other operations may be added to the process flow 600. In addition, while process flow 600 shows processes between the UE 615-*a*, the UE 615-*b*, and the UE 615-*n*, it should be understood that these processes may occur between any number of network devices.

At 620, the initiator UE 615-*a* may transmit (e.g., broadcast), via at least one sidelink connection to one or more target UEs 615 (e.g., UE 615-*b* through UE 615-*n*), a group sidelink communication request that includes a sidelink ranging service identifier. For example, the initiator UE 615-*a* may transmit a direct communication request or a PC5-S message, which may include a service identifier (e.g., sidelink ranging service identifier) initiating a sidelink-based ranging session with the target UEs 615 (e.g., UE 615-*b* through UE 615-*n*). In some cases, the service identifier may be or otherwise include a V2X service identifier. In some examples, the group sidelink communication request may be a broadcast sidelink communication request. For example, the initiator UE 615-*a* may broadcast the PC5-S message which includes the sidelink-based ranging session service identifier.

At 625, the initiator UE 615-*a* may communicate one or more security establishment messages with target UEs 615 (e.g., UE 615-*b* through UE 615-*n*) corresponding to the sidelink ranging service identifier (e.g., establish, via the at least one sidelink connection, a plurality of unicast sidelink sessions with the plurality of target UEs). For example, the initiator UE 615-*a* and each of the target UEs (UE 615-*b* through UE 615-*n*) may establish a security establishment session via PC-5 S unicast message (e.g., unicast sidelink session). In some examples, the initiator UE 615-*a* and target UEs 615 may communicate the security establishment messages via PC5 unicast messages. At 630, the target UEs 615 (e.g., UE 615-*b* through UE 615-*n*) may each transmit a communication acceptance message to the initiator UE 615-*a* which may indicate to the initiator UE 615-*a* that the target UEs 615 accept the sidelink-based ranging session request. In some cases, each target UE 615 may transmit the communication acceptance message via a PC5 unicast message.

At 635, the initiator UE 615-*a* may transmit to the target UEs 615 (e.g., UE 615-*b* through UE 615-*n*), via the at least one sidelink connection, one or more PRS requests (e.g., PRSrequest) via one or more unicast sidelink sessions to initiate one or more sidelink ranging sessions. In some cases, the one or more sidelink ranging sessions may include one or more physical layer ranging sessions (e.g., PC5) which may be transmitted using an ITS band (e.g., a licensed band). In some examples, the one or more PRS requests may be processed on a sidelink physical layer. In some other cases, the one or more sidelink ranging sessions may include one or more RRC layer ranging sessions which may be transmitted using an ITS band (e.g., a licensed band). In some examples, the one or more PRS requests may be processed on a RRC layer. In some examples, the one or more PRS requests may include a field to specify a broadcast destination identifier (e.g., a broadcast destination L2 identifier) for a PC5-S postPRS message.

At 640, the initiator UE 615-*a* may receive, via the at least one sidelink connection, one or more PRS responses (e.g., PRSresponse) from the one or more target UEs 615 (e.g., UE 615-*b* through UE 615-*n*) during each of the one or more of unicast sidelink ranging sessions. In some examples, the one or more PRS responses may be processed at a physical layer or an RRC layer. At 645, the initiator UE 615-*a* may transmit to the target UEs 615 (e.g., UE 615-*b* through UE 615-*n*), via the at least one sidelink connection, one or more PRS confirmation messages (e.g., PRSconfirmation) via one or more unicast sidelink sessions in response to the one or more received PRS responses. In some examples, the one or more PRS confirmation messages may include the broadcast destination identifier (e.g., a broadcast destination L2 identifier) for the PC5-S postPRS message that is the same as the broadcast destination identifier from the one or more PRS requests.

At 650, each UE 615 participating in the sidelink-based ranging session (e.g., UE 615-*a* through UE 615-*n*) may perform a PRS broadcast to all other UEs 615 participating in the sidelink-based ranging session. For example, the initiator UE 615-*a* may broadcast the PRS message towards all other UEs 615 participating in the sidelink-based ranging session (e.g., UE 615-*b* through the UE 615-*n*) and vice versa for all other UEs 615 participating in the sidelink-based ranging session. In some examples, each UE 615 may broadcast the PRS message in a non-ITS band (e.g., an unlicensed band).

At 655, the UEs 615 participating in the sidelink-based ranging session (e.g., UE 615-*a* through UE 615-*n*) may return to an ITS band (e.g., a licensed band) and may exchange measurements associated with position (e.g., post- PRS) via broadcast messaging that may be processed at a physical layer or an RRC layer. For example, if there are NUEs 615 that are participating in the sidelink-based ranging session, then each UE 615 may transmit position-based measurements for the other N−1 UEs 615 participating in the sidelink-based ranging session over a PC5 postPRS broadcast. In one example, the initiator UE 615-a may transmit a PC5 broadcast postPRS message that includes position-based measurements specific to each target UE 615 (e.g., UE 615 b through 615-n). The UE 615-a may also receive a PC5 broadcast postPRS from every target UE 615 (e.g., UE 615-b through 615-n) with measurements associated with position relative to UE 615-a.

Figure 7:
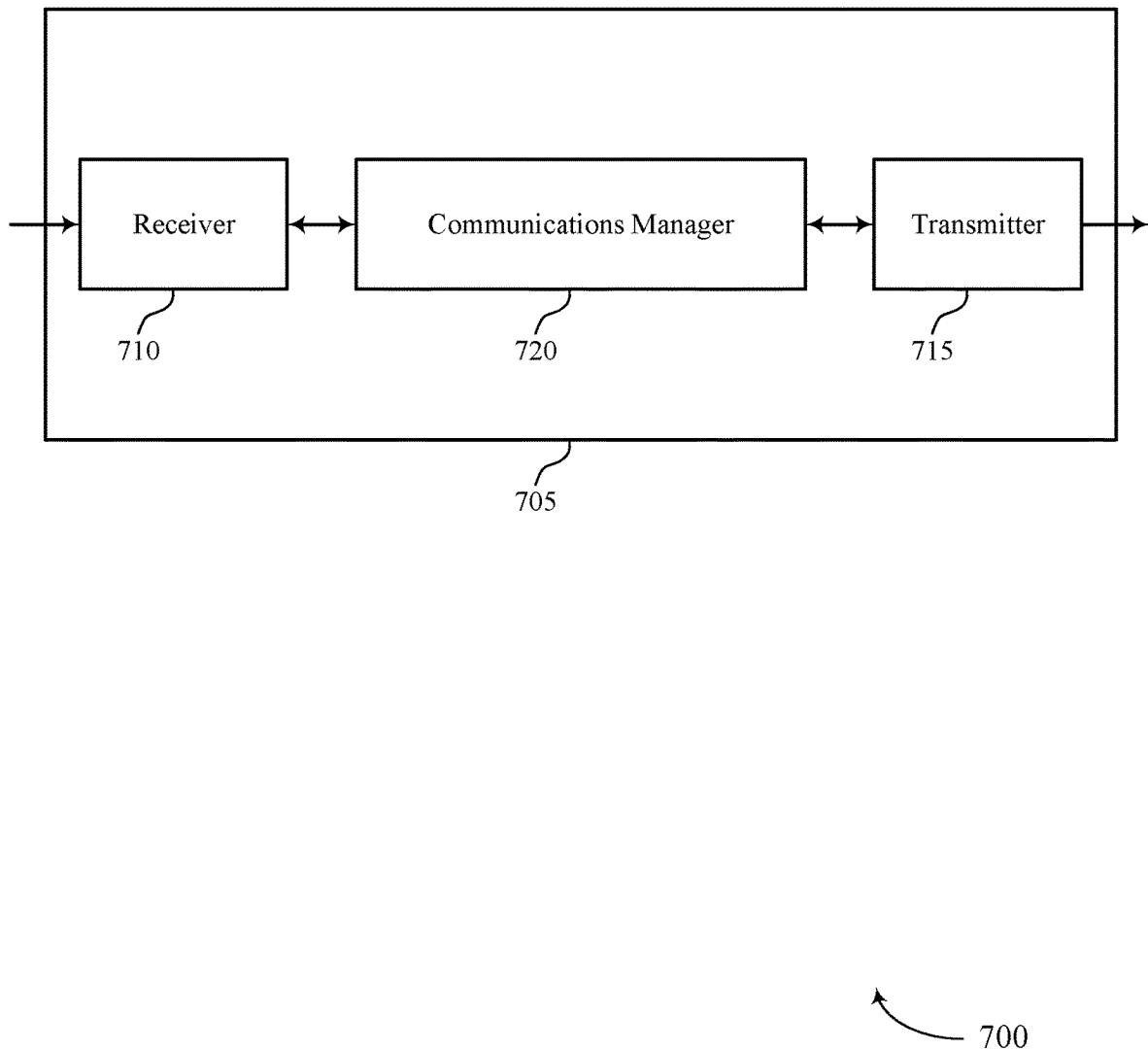
FIGS. 7 and 8 show block diagrams of devices in accordance with aspects of the present disclosure.

FIG. 7 shows a block diagram 700 of a device 705 that supports sidelink-based positioning using sidelink signaling in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink-based positioning using sidelink signaling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink-based positioning using sidelink signaling). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of sidelink-based positioning using sidelink signaling as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at an initiator UE in accordance with examples as disclosed herein. For example, the communications manager 720 may be configured as or otherwise support a means for broadcasting, via a sidelink connection to a set of multiple target UEs, a group sidelink communication request that including a sidelink ranging service identifier. The communications manager 720 may be configured as or otherwise support a means for establishing, via the sidelink connection, a set of multiple unicast sidelink sessions with the set of multiple target UEs. The communications manager 720 may be configured as or otherwise support a means for transmitting, via the sidelink connection, a set of multiple position reference signal requests via the set of multiple unicast sidelink sessions to initiate a set of multiple sidelink ranging sessions. The communications manager 720 may be configured as or otherwise support a means for receiving, via the sidelink connection, a set of multiple position reference signal responses from the set of multiple target UEs during each of the set of multiple sidelink ranging sessions.

Additionally or alternatively, the communications manager 720 may support wireless communication at a target UE in accordance with examples as disclosed herein. For example, the communications manager 720 may be configured as or otherwise support a means for receiving, from an initiator UE via a sidelink connection, a group sidelink communication request that includes a sidelink ranging service identifier. The communications manager 720 may be configured as or otherwise support a means for establishing, via the sidelink connection, a unicast sidelink session with the initiator UE. The communications manager 720 may be configured as or otherwise support a means for receiving, via the sidelink connection, a position reference signal request via the unicast sidelink session to initiate a sidelink ranging session. The communications manager 720 may be configured as or otherwise support a means for transmitting, via the sidelink connection, a position reference signal response to the initiator UE during the sidelink ranging session.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more efficient utilization of communication resources.

Figure 8:
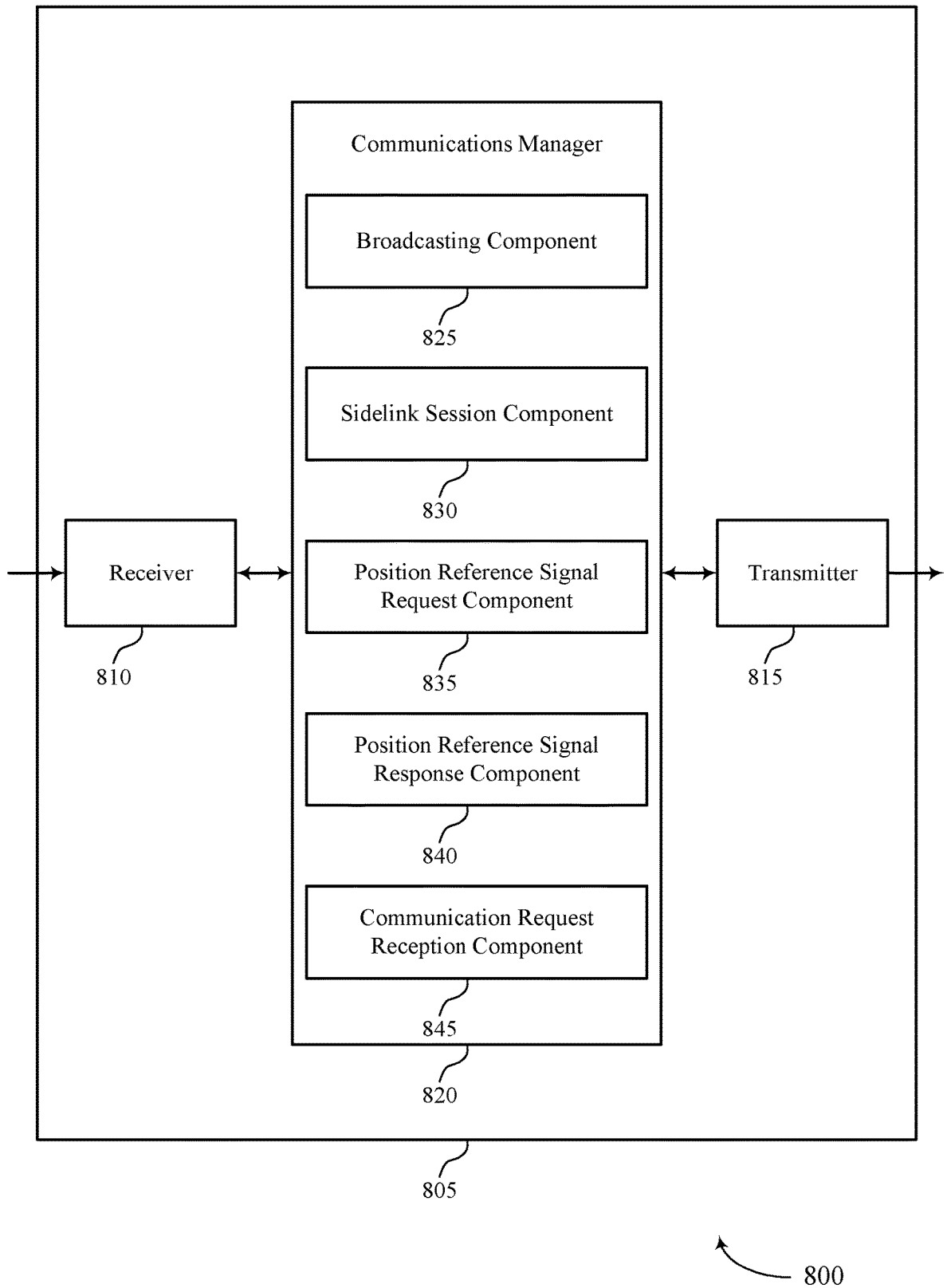

FIG. 8 shows a block diagram 800 of a device 805 that supports sidelink-based positioning using sidelink signaling in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sidelink-based positioning using sidelink signaling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sidelink-based positioning using sidelink signaling). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of sidelink-based positioning using sidelink signaling as described herein. For example, the communications manager 820 may include a broadcasting component 825, a sidelink session component 830, a position reference signal request component 835, a position reference signal response component 840, a communication request reception component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at an initiator UE in accordance with examples as disclosed herein. The broadcasting component 825 may be configured as or otherwise support a means for broadcasting, via a sidelink connection to a set of multiple target UEs, a group sidelink communication request that includes a sidelink ranging service identifier. The sidelink session component 830 may be configured as or otherwise support a means for establishing, via the sidelink connection, a set of multiple unicast sidelink sessions with the set of multiple target UEs. The position reference signal request component 835 may be configured as or otherwise support a means for transmitting, via the sidelink connection, a set of multiple position reference signal requests via the set of multiple unicast sidelink sessions to initiate a set of multiple sidelink ranging sessions. The position reference signal response component 840 may be configured as or otherwise support a means for receiving, via the sidelink connection, a set of multiple position reference signal responses from the set of multiple target UEs during each of the set of multiple sidelink ranging sessions.

Additionally or alternatively, the communications manager 820 may support wireless communication at a target UE in accordance with examples as disclosed herein. The communication request reception component 845 may be configured as or otherwise support a means for receiving, from an initiator UE via a sidelink connection, a group sidelink communication request that includes a sidelink ranging service identifier. The sidelink session component 830 may be configured as or otherwise support a means for establishing, via the sidelink connection, a unicast sidelink session with the initiator UE. The position reference signal request component 835 may be configured as or otherwise support a means for receiving, via the sidelink connection, a position reference signal request via the unicast sidelink session to initiate a sidelink ranging session. The position reference signal response component 840 may be configured as or otherwise support a means for transmitting, via the sidelink connection, a position reference signal response to the initiator UE during the sidelink ranging session.

Figure 9:
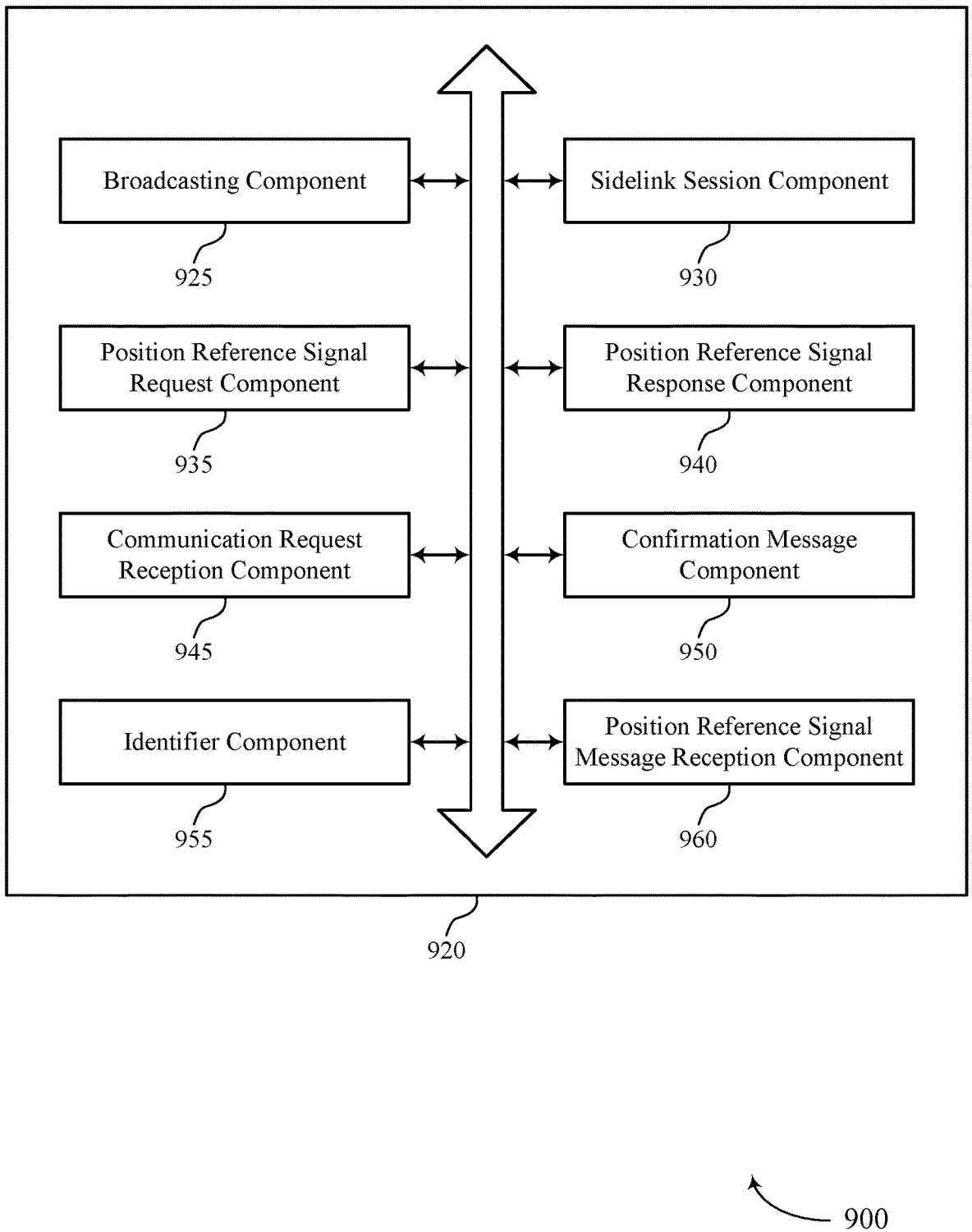
FIG. 9 shows a block diagram of a communications manager in accordance with aspects of the present disclosure.

FIG. 9 shows a block diagram 900 of a communications manager 920 that supports sidelink-based positioning using sidelink signaling in accordance with aspects of the present disclosure. The communications manager 920 may be an example of aspects of a communications manager 720, a communications manager 820, or both, as described herein. The communications manager 920, or various components thereof, may be an example of means for performing various aspects of sidelink-based positioning using sidelink signaling as described herein. For example, the communications manager 920 may include a broadcasting component 925, a sidelink session component 930, a position reference signal request component 935, a position reference signal response component 940, a communication request reception component 945, a confirmation message component 950, an identifier component 955, a position reference signal message reception component 960, or any combination thereof. Each of these components may communicate, directly or indirectly, with one another (e.g., via one or more buses).

The communications manager 920 may support wireless communication at an initiator UE in accordance with examples as disclosed herein. The broadcasting component 925 may be configured as or otherwise support a means for broadcasting, via a sidelink connection to a set of multiple target UEs, a group sidelink communication request that includes a sidelink ranging service identifier. The sidelink session component 930 may be configured as or otherwise support a means for establishing, via the sidelink connection, a set of multiple unicast sidelink sessions with the set of multiple target UEs. The position reference signal request component 935 may be configured as or otherwise support a means for transmitting, via the sidelink connection, a set of multiple position reference signal requests via the set of multiple unicast sidelink sessions to initiate a set of multiple sidelink ranging sessions. The position reference signal response component 940 may be configured as or otherwise support a means for receiving, via the sidelink connection, a set of multiple position reference signal responses from the set of multiple target UEs during each of the set of multiple sidelink ranging sessions.

In some examples, to support broadcasting the group sidelink communication request, the broadcasting component 925 may be configured as or otherwise support a means for transmitting, via the sidelink connection to the set of multiple target UEs, the group sidelink communication request including a broadcast identifier or a groupcast identifier. In some examples, the identifier component 955 may be configured as or otherwise support a means for transmitting a broadcast position reference signal message or a groupcast position reference signal message including the broadcast identifier or the groupcast identifier.

In some examples, to support receiving the set of multiple position reference signal responses, the position reference signal response component 940 may be configured as or otherwise support a means for receiving the set of multiple position reference signal responses that are each a broadcast position reference signal response corresponding to the broadcast identifier or are each a groupcast position reference signal response corresponding to the groupcast identifier.

In some examples, the confirmation message component 950 may be configured as or otherwise support a means for transmitting at least one position reference signal confirmation message in response to the set of multiple position reference signal responses. In some examples, to support transmitting the at least one position reference signal confirmation message, the confirmation message component 950 may be configured as or otherwise support a means for transmitting a set of multiple unicast position reference signal confirmation messages in response to the set of multiple position reference signal responses.

In some examples, to support transmitting the at least one position reference signal confirmation message, the confirmation message component 950 may be configured as or otherwise support a means for transmitting a broadcast position reference signal confirmation message or a groupcast position reference signal confirmation message in response to the set of multiple position reference signal responses.

In some examples, to support receiving the set of multiple position reference signal responses, the position reference signal response component 940 may be configured as or otherwise support a means for receiving the set of multiple position reference signal responses that are each a unicast position reference signal response. In some examples, the set of multiple sidelink ranging sessions include a set of multiple application layer ranging sessions. In some examples, the set of multiple position reference signal requests and the set of multiple position reference signal responses are processed at an application layer.

In some examples, the set of multiple sidelink ranging sessions include a set of multiple sidelink physical layer ranging sessions. In some examples, the set of multiple position reference signal requests and the set of multiple position reference signal responses are processed at a sidelink physical layer.

In some examples, the set of multiple sidelink ranging sessions include a set of multiple radio resource control layer ranging sessions. In some examples, the set of multiple position reference signal requests and the set of multiple position reference signal responses are processed at a radio resource control layer. In some examples, the group sidelink communication request includes a PC5 sidelink message and the sidelink ranging service identifier includes a V2X service identifier.

Additionally or alternatively, the communications manager 920 may support wireless communication at a target UE in accordance with examples as disclosed herein. The communication request reception component 945 may be configured as or otherwise support a means for receiving, from an initiator UE via a sidelink connection, a group sidelink communication request that includes a sidelink ranging service identifier. In some examples, the sidelink session component 930 may be configured as or otherwise support a means for establishing, via the sidelink connection, a unicast sidelink session with the initiator UE. In some examples, the position reference signal request component 935 may be configured as or otherwise support a means for receiving, via the sidelink connection, a position reference signal request via the unicast sidelink session to initiate a sidelink ranging session. In some examples, the position reference signal response component 940 may be configured as or otherwise support a means for transmitting, via the sidelink connection, a position reference signal response to the initiator UE during the sidelink ranging session.

In some examples, to support receiving the group sidelink communication request, the communication request reception component 945 may be configured as or otherwise support a means for receiving the group sidelink communication request broadcasted to a set of multiple target UEs. In some examples, to support receiving the group sidelink communication request, the communication request reception component 945 may be configured as or otherwise support a means for receiving, from the initiator UE via the sidelink connection, the group sidelink communication request including a broadcast identifier or a groupcast identifier.

In some examples, the position reference signal message reception component 960 may be configured as or otherwise support a means for receiving a broadcast position reference signal message or a groupcast position reference signal message including the broadcast identifier or the groupcast identifier.

In some examples, to support transmitting the position reference signal response, the position reference signal response component 940 may be configured as or otherwise support a means for transmitting a broadcast position reference signal response corresponding to the broadcast identifier or a groupcast position reference signal response corresponding to the groupcast identifier.

In some examples, the confirmation message component 950 may be configured as or otherwise support a means for receiving a position reference signal confirmation message in response to the position reference signal response. In some examples, to support receiving the position reference signal confirmation message, the confirmation message component 950 may be configured as or otherwise support a means for receiving a unicast position reference signal confirmation in response to the position reference signal response.

In some examples, to support receiving the position reference signal confirmation message, the confirmation message component 950 may be configured as or otherwise support a means for receiving a broadcast position reference signal confirmation message or a groupcast position reference signal confirmation message in response to the position reference signal response.

In some examples, to support transmitting the position reference signal response, the position reference signal response component 940 may be configured as or otherwise support a means for transmitting a unicast position reference signal response.

In some examples, the sidelink ranging session includes an application layer ranging session. In some examples, the position reference signal request and the position reference signal response are processed at an application layer.

In some examples, the sidelink ranging session includes a sidelink physical layer ranging session. In some examples, the position reference signal request and the position reference signal response are processed at a sidelink physical layer. In some examples, the sidelink ranging session includes a radio resource control layer ranging session. In some examples, the position reference signal request and the position reference signal response are processed at a radio resource control layer. In some examples, the group sidelink communication request includes a PC5 sidelink message and the sidelink ranging service identifier includes a V2X service identifier.

Figure 10:
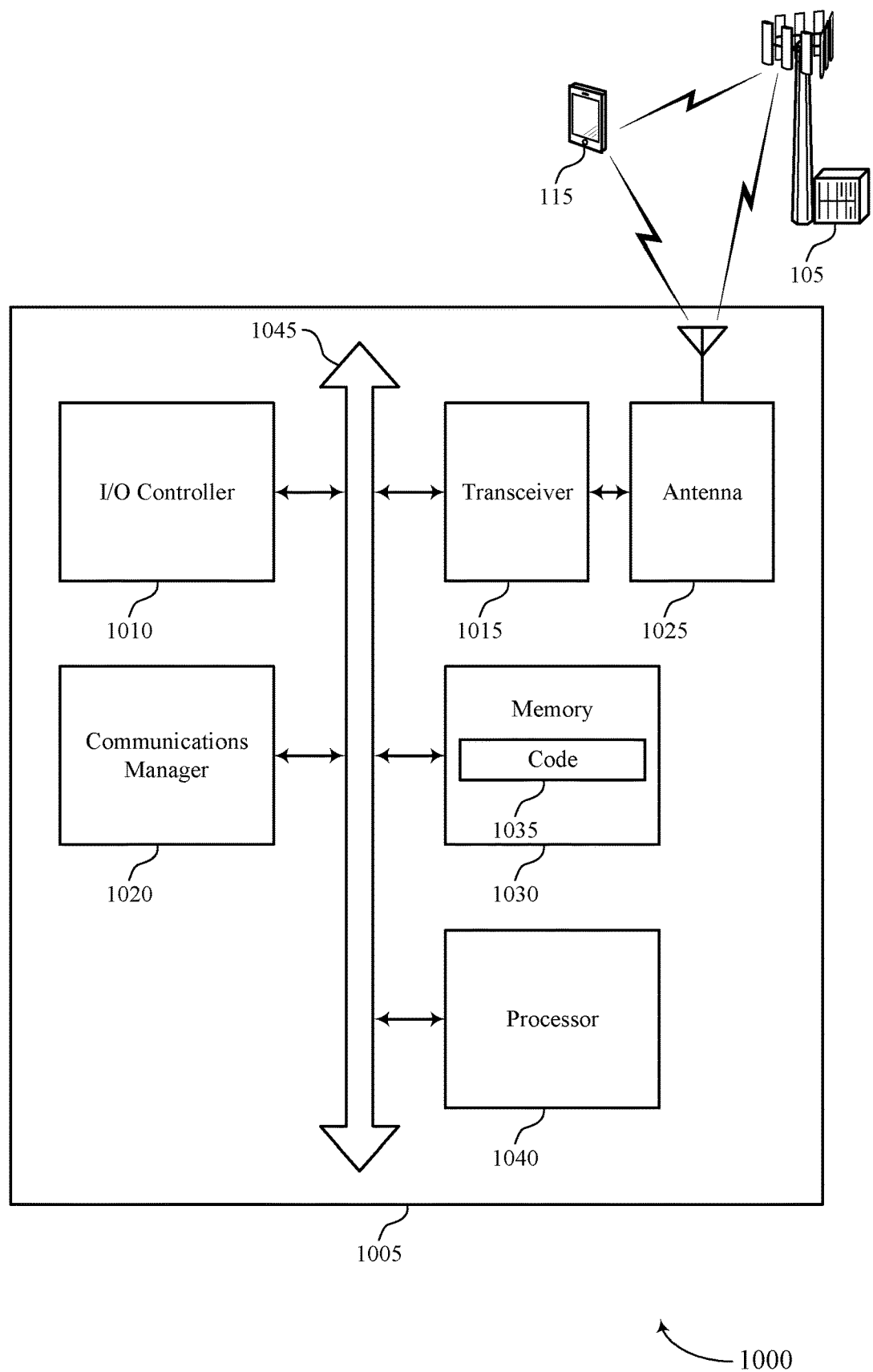
FIG. 10 shows a diagram of a system including a device in accordance with aspects of the present disclosure.

FIG. 10 shows a diagram of a system 1000 including a device 1005 that supports sidelink-based positioning using sidelink signaling in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sidelink-based positioning using sidelink signaling). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at an initiator UE in accordance with examples as disclosed herein. For example, the communications manager 1020 may be configured as or otherwise support a means for broadcasting, via a sidelink connection to a set of multiple target UEs, a group sidelink communication request that including a sidelink ranging service identifier. The communications manager 1020 may be configured as or otherwise support a means for establishing, via the sidelink connection, a set of multiple unicast sidelink sessions with the set of multiple target UEs. The communications manager 1020 may be configured as or otherwise support a means for transmitting, via the sidelink connection, a set of multiple position reference signal requests via the set of multiple unicast sidelink sessions to initiate a set of multiple sidelink ranging sessions. The communications manager 1020 may be configured as or otherwise support a means for receiving, via the sidelink connection, a set of multiple position reference signal responses from the set of multiple target UEs during each of the set of multiple sidelink ranging sessions.

Additionally or alternatively, the communications manager 1020 may support wireless communication at a target UE in accordance with examples as disclosed herein. For example, the communications manager 1020 may be configured as or otherwise support a means for receiving, from an initiator UE via a sidelink connection, a group sidelink communication request that includes a sidelink ranging service identifier. The communications manager 1020 may be configured as or otherwise support a means for establishing, via the sidelink connection, a unicast sidelink session with the initiator UE. The communications manager 1020 may be configured as or otherwise support a means for receiving, via the sidelink connection, a position reference signal request via the unicast sidelink session to initiate a sidelink ranging session. The communications manager 1020 may be configured as or otherwise support a means for transmitting, via the sidelink connection, a position reference signal response to the initiator UE during the sidelink ranging session.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of sidelink-based positioning using sidelink signaling as described herein, or the processor 1040 and the memory 1030 may be otherwise configured to perform or support such operations.

Figure 11:
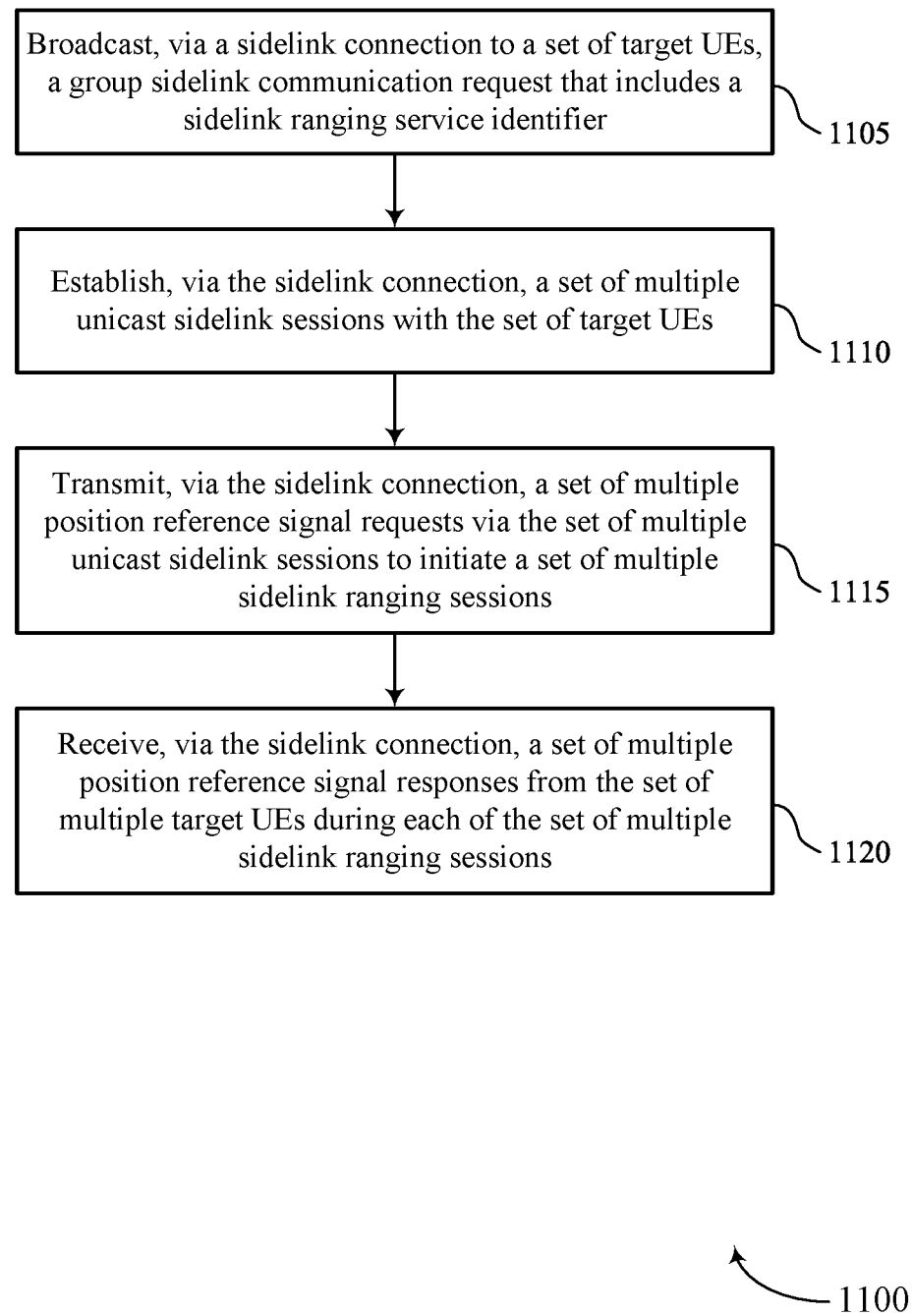
FIGS. 11 through 14 show flowcharts illustrating methods that support sidelink-based positioning using sidelink signaling in accordance with aspects of the present disclosure.

FIG. 11 shows a flowchart illustrating a method 1100 that supports sidelink-based positioning using sidelink signaling in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include broadcasting, via a sidelink connection to a set of multiple target UEs, a group sidelink communication request that includes a sidelink ranging service identifier. The operations of 1105 may be performed in accordance with examples as disclosed herein. In some examples, aspects of the operations of 1105 may be performed by a broadcasting component 925 as described with reference to FIG. 9.

At 1110, the method may include establishing, via the sidelink connection, a set of multiple unicast sidelink sessions with the set of multiple target UEs. The operations of 1110 may be performed in accordance with examples as disclosed herein. In some examples, aspects of the operations of 1110 may be performed by a sidelink session component 930 as described with reference to FIG. 9.

At 1115, the method may include transmitting, via the sidelink connection, a set of multiple position reference signal requests via the set of multiple unicast sidelink sessions to initiate a set of multiple sidelink ranging sessions. The operations of 1115 may be performed in accordance with examples as disclosed herein. In some examples, aspects of the operations of 1115 may be performed by a position reference signal request component 935 as described with reference to FIG. 9.

At 1120, the method may include receiving, via the sidelink connection, a set of multiple position reference signal responses from the set of multiple target UEs during each of the set of multiple sidelink ranging sessions. The operations of 1120 may be performed in accordance with examples as disclosed herein. In some examples, aspects of the operations of 1120 may be performed by a position reference signal response component 940 as described with reference to FIG. 9.

Figure 12:
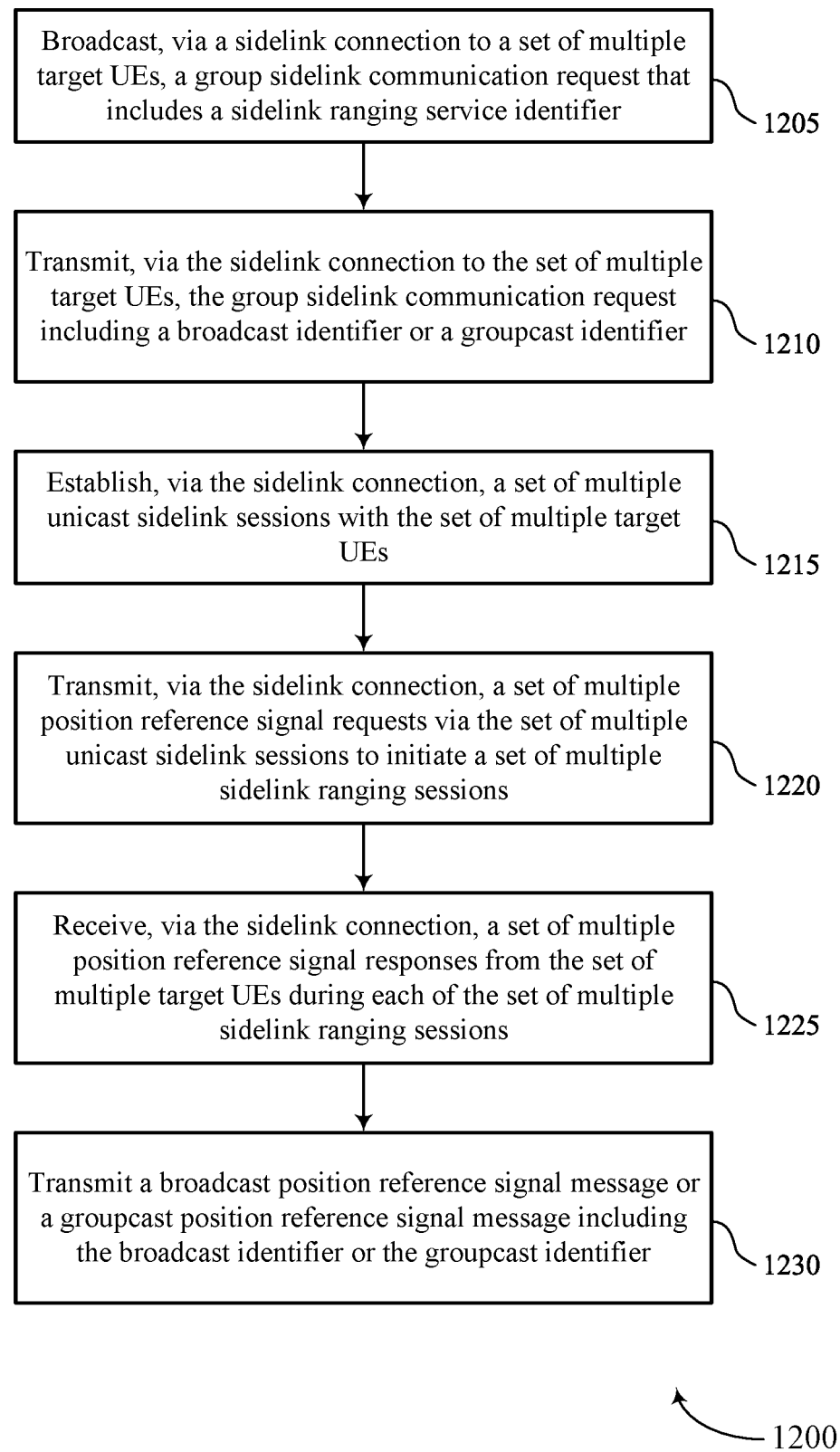

FIG. 12 shows a flowchart illustrating a method 1200 that supports sidelink-based positioning using sidelink signaling in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include broadcasting, via a sidelink connection to a set of multiple target UEs, a group sidelink communication request that includes a sidelink ranging service identifier. The operations of 1205 may be performed in accordance with examples as disclosed herein. In some examples, aspects of the operations of 1205 may be performed by a broadcasting component 925 as described with reference to FIG. 9.

At 1210, the method may include transmitting, via the sidelink connection to the set of multiple target UEs, the group sidelink communication request including a broadcast identifier or a groupcast identifier. The operations of 1210 may be performed in accordance with examples as disclosed herein. In some examples, aspects of the operations of 1210 may be performed by a broadcasting component 925 as described with reference to FIG. 9.

At 1215, the method may include establishing, via the sidelink connection, a set of multiple unicast sidelink sessions with the set of multiple target UEs. The operations of 1215 may be performed in accordance with examples as disclosed herein. In some examples, aspects of the operations of 1215 may be performed by a sidelink session component 930 as described with reference to FIG. 9.

At 1220, the method may include transmitting, via the sidelink connection, a set of multiple position reference signal requests via the set of multiple unicast sidelink sessions to initiate a set of multiple sidelink ranging sessions. The operations of 1220 may be performed in accordance with examples as disclosed herein. In some examples, aspects of the operations of 1220 may be performed by a position reference signal request component 935 as described with reference to FIG. 9.

At 1225, the method may include receiving, via the sidelink connection, a set of multiple position reference signal responses from the set of multiple target UEs during each of the set of multiple sidelink ranging sessions. The operations of 1225 may be performed in accordance with examples as disclosed herein. In some examples, aspects of the operations of 1225 may be performed by a position reference signal response component 940 as described with reference to FIG. 9.

At 1230, the method may include transmitting a broadcast position reference signal message or a groupcast position reference signal message including the broadcast identifier or the groupcast identifier. The operations of 1230 may be performed in accordance with examples as disclosed herein. In some examples, aspects of the operations of 1230 may be performed by an identifier component 955 as described with reference to FIG. 9.

Figure 13:
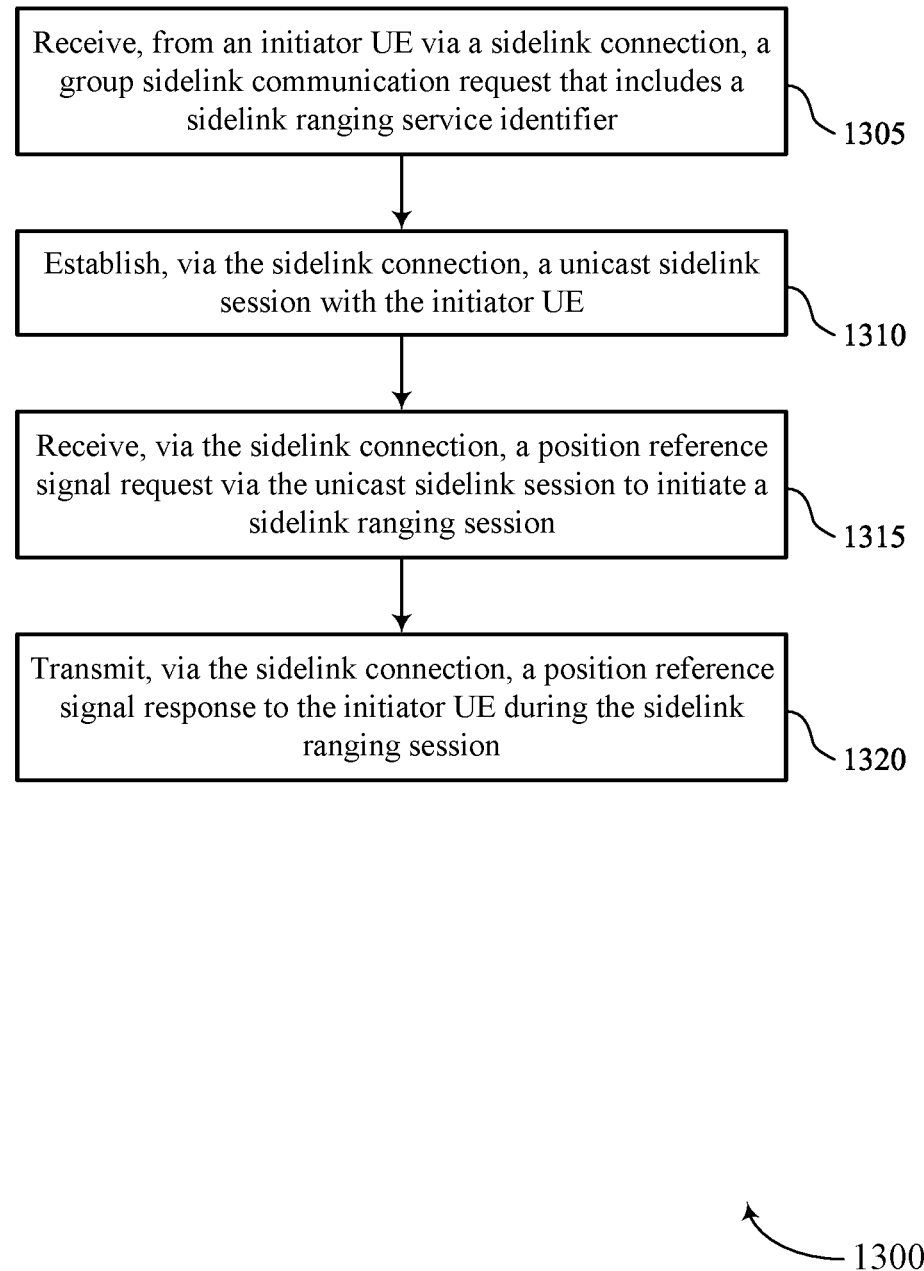

FIG. 13 shows a flowchart illustrating a method 1300 that supports sidelink-based positioning using sidelink signaling in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from an initiator UE via a sidelink connection, a group sidelink communication request that includes a sidelink ranging service identifier. The operations of 1305 may be performed in accordance with examples as disclosed herein. In some examples, aspects of the operations of 1305 may be performed by a communication request reception component 945 as described with reference to FIG. 9.

At 1310, the method may include establishing, via the sidelink connection, a unicast sidelink session with the initiator UE. The operations of 1310 may be performed in accordance with examples as disclosed herein. In some examples, aspects of the operations of 1310 may be performed by a sidelink session component 930 as described with reference to FIG. 9.

At 1315, the method may include receiving, via the sidelink connection, a position reference signal request via the unicast sidelink session to initiate a sidelink ranging session. The operations of 1315 may be performed in accordance with examples as disclosed herein. In some examples, aspects of the operations of 1315 may be performed by a position reference signal request component 935 as described with reference to FIG. 9.

At 1320, the method may include transmitting, via the sidelink connection, a position reference signal response to the initiator UE during the sidelink ranging session. The operations of 1320 may be performed in accordance with examples as disclosed herein. In some examples, aspects of the operations of 1320 may be performed by a position reference signal response component 940 as described with reference to FIG. 9.

Figure 14:
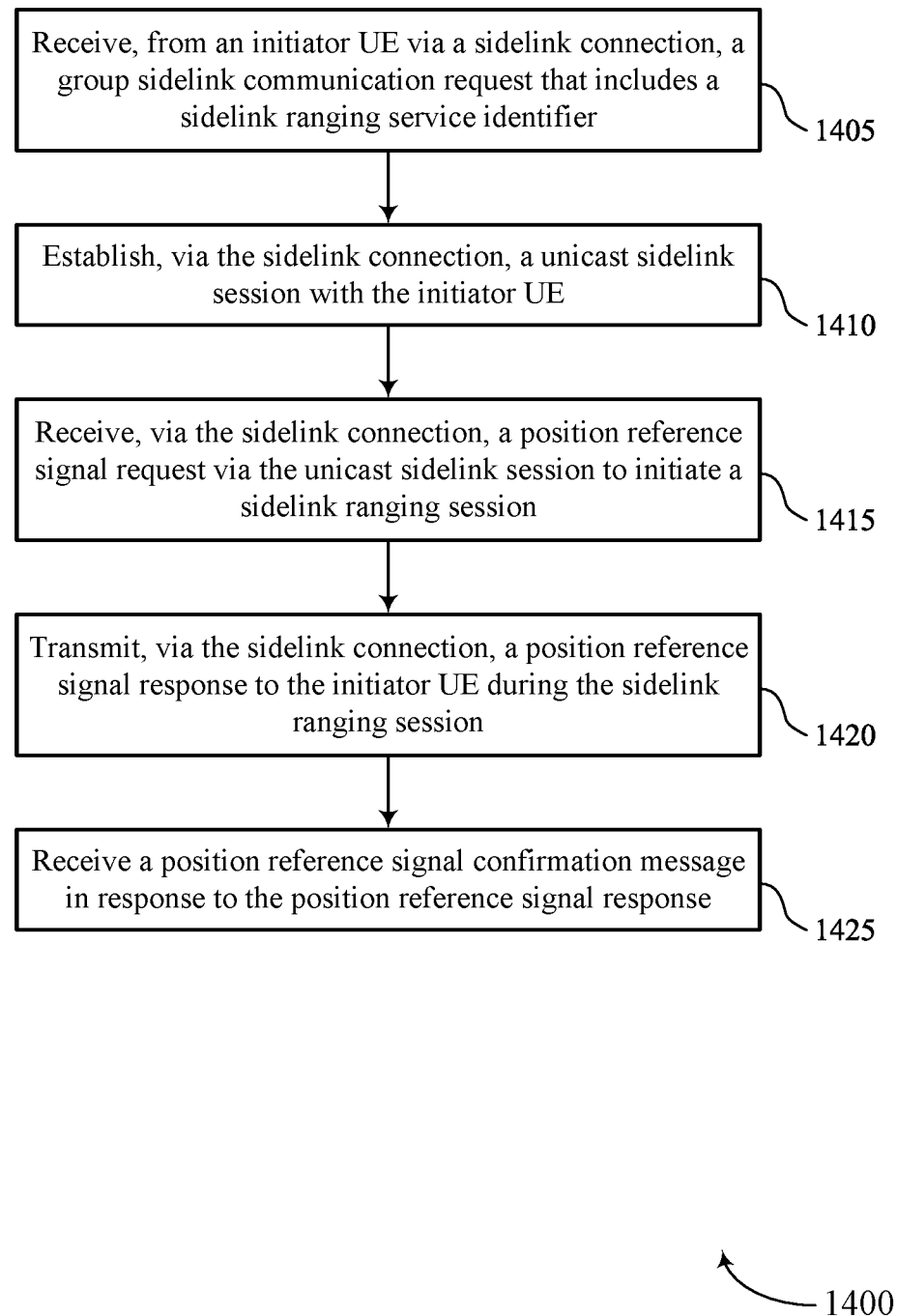

FIG. 14 shows a flowchart illustrating a method 1400 that supports sidelink-based positioning using sidelink signaling in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving, from an initiator UE via a sidelink connection, a group sidelink communication request that includes a sidelink ranging service identifier. The operations of 1405 may be performed in accordance with examples as disclosed herein. In some examples, aspects of the operations of 1405 may be performed by a communication request reception component 945 as described with reference to FIG. 9.

At 1410, the method may include establishing, via the sidelink connection, a unicast sidelink session with the initiator UE. The operations of 1410 may be performed in accordance with examples as disclosed herein. In some examples, aspects of the operations of 1410 may be performed by a sidelink session component 930 as described with reference to FIG. 9.

At 1415, the method may include receiving, via the sidelink connection, a position reference signal request via the unicast sidelink session to initiate a sidelink ranging session. The operations of 1415 may be performed in accordance with examples as disclosed herein. In some examples, aspects of the operations of 1415 may be performed by a position reference signal request component 935 as described with reference to FIG. 9.

At 1420, the method may include transmitting, via the sidelink connection, a position reference signal response to the initiator UE during the sidelink ranging session. The operations of 1420 may be performed in accordance with examples as disclosed herein. In some examples, aspects of the operations of 1420 may be performed by a position reference signal response component 940 as described with reference to FIG. 9.

At 1425, the method may include receiving a position reference signal confirmation message in response to the position reference signal response. The operations of 1425 may be performed in accordance with examples as disclosed herein. In some examples, aspects of the operations of 1425 may be performed by a confirmation message component 950 as described with reference to FIG. 9.

The following provides an overview of aspects of the present disclosure:

Aspect 1: A method for wireless communication at an initiator UE, comprising: broadcasting, via a sidelink connection to a plurality of target UEs, a group sidelink communication request that comprises a sidelink ranging service identifier; establishing, via the sidelink connection, a plurality of unicast sidelink sessions with the plurality of target UEs; transmitting, via the sidelink connection, a plurality of position reference signal requests via the plurality of unicast sidelink sessions to initiate a plurality of sidelink ranging sessions; and receiving, via the sidelink connection, a plurality of position reference signal responses from the plurality of target UEs during each of the plurality of sidelink ranging sessions.

Aspect 2: The method of aspect 1, wherein broadcasting the group sidelink communication request comprises: transmitting, via the sidelink connection to the plurality of target UEs, the group sidelink communication request comprising a broadcast identifier or a groupcast identifier.

Aspect 3: The method of aspect 2, further comprising: transmitting a broadcast position reference signal message or a groupcast position reference signal message comprising the broadcast identifier or the groupcast identifier.

Aspect 4: The method of any of aspects 2 through 3, wherein receiving the plurality of position reference signal responses comprises: receiving the plurality of position reference signal responses that are each a broadcast position reference signal response corresponding to the broadcast identifier or are each a groupcast position reference signal response corresponding to the groupcast identifier.

Aspect 5: The method of any of aspects 1 through 4, further comprising: transmitting at least one position reference signal confirmation message in response to the plurality of position reference signal responses.

Aspect 6: The method of aspect 5, wherein transmitting the at least one position reference signal confirmation message comprises: transmitting a plurality of unicast position reference signal confirmation messages in response to the plurality of position reference signal responses.

Aspect 7: The method of any of aspects 5 through 6, wherein transmitting the at least one position reference signal confirmation message comprises: transmitting a broadcast position reference signal confirmation message or a groupcast position reference signal confirmation message in response to the plurality of position reference signal responses.

Aspect 8: The method of any of aspects 1 through 7, wherein receiving the plurality of position reference signal responses comprises: receiving the plurality of position reference signal responses that are each a unicast position reference signal response.

Aspect 9: The method of any of aspects 1 through 8, wherein the plurality of sidelink ranging sessions comprise a plurality of application layer ranging sessions, and the plurality of position reference signal requests and the plurality of position reference signal responses are processed at an application layer.

Aspect 10: The method of any of aspects 1 through 9, wherein the plurality of sidelink ranging sessions comprise a plurality of sidelink physical layer ranging sessions, and the plurality of position reference signal requests and the plurality of position reference signal responses are processed at a sidelink physical layer.

Aspect 11: The method of any of aspects 1 through 10, wherein the plurality of sidelink ranging sessions comprise a plurality of radio resource control layer ranging sessions, and the plurality of position reference signal requests and the plurality of position reference signal responses are processed at a radio resource control layer.

Aspect 12: The method of any of aspects 1 through 11, wherein the group sidelink communication request comprises a PC5 sidelink message and the sidelink ranging service identifier comprises a vehicle-to-everything (V2X) service identifier.

Aspect 13: A method for wireless communication at a target UE, comprising: receiving, from an initiator UE via a sidelink connection, a group sidelink communication request that comprises a sidelink ranging service identifier; establishing, via the sidelink connection, a unicast sidelink session with the initiator UE; receiving, via the sidelink connection, a position reference signal request via the unicast sidelink session to initiate a sidelink ranging session; and transmitting, via the sidelink connection, a position reference signal response to the initiator UE during the sidelink ranging session.

Aspect 14: The method of aspect 13, wherein receiving the group sidelink communication request comprises: receiving the group sidelink communication request broadcasted to a plurality of target UEs.

Aspect 15: The method of any of aspects 13 through 14, wherein receiving the group sidelink communication request comprises: receiving, from the initiator UE via the sidelink connection, the group sidelink communication request comprising a broadcast identifier or a groupcast identifier.

Aspect 16: The method of aspect 15, further comprising: receiving a broadcast position reference signal message or a groupcast position reference signal message comprising the broadcast identifier or the groupcast identifier.

Aspect 17: The method of any of aspects 15 through 16, wherein transmitting the position reference signal response comprises: transmitting a broadcast position reference signal response corresponding to the broadcast identifier or a groupcast position reference signal response corresponding to the groupcast identifier.

Aspect 18: The method of any of aspects 13 through 17, further comprising: receiving a position reference signal confirmation message in response to the position reference signal response.

Aspect 19: The method of aspect 18, wherein receiving the position reference signal confirmation message comprises: receiving a unicast position reference signal confirmation in response to the position reference signal response.

Aspect 20: The method of any of aspects 18 through 19, wherein receiving the position reference signal confirmation message comprises: receiving a broadcast position reference signal confirmation message or a groupcast position reference signal confirmation message in response to the position reference signal response.

Aspect 21: The method of any of aspects 13 through 20, wherein transmitting the position reference signal response comprises: transmitting a unicast position reference signal response.

Aspect 22: The method of any of aspects 13 through 21, wherein the sidelink ranging session comprises an application layer ranging session, and the position reference signal request and the position reference signal response are processed at an application layer.

Aspect 23: The method of any of aspects 13 through 22, wherein the sidelink ranging session comprises a sidelink physical layer ranging session, and the position reference signal request and the position reference signal response are processed at a sidelink physical layer.

Aspect 24: The method of any of aspects 13 through 23, wherein the sidelink ranging session comprises a radio resource control layer ranging session, and the position reference signal request and the position reference signal response are processed at a radio resource control layer.

Aspect 25: The method of any of aspects 13 through 24, wherein the group sidelink communication request comprises a PC5 sidelink message and the sidelink ranging service identifier comprises a vehicle-to-everything (V2X) service identifier.

Aspect 26: An apparatus for wireless communication at an initiator UE, comprising a processor; memory coupled with the processor; and instructions stored in the memory and executable by the processor to cause the apparatus to perform a method of any of aspects 1 through 12.

Aspect 27: An apparatus for wireless communication at an initiator UE, comprising at least one means for performing a method of any of aspects 1 through 12.

Aspect 28: A non-transitory computer-readable medium storing code for wireless communication at an initiator UE, the code comprising instructions executable by a processor to perform a method of any of aspects 1 through 12.

Aspect 29: An apparatus for wireless communication at a target UE, comprising a processor; memory coupled with the processor; and instructions stored in the memory and executable by the processor to cause the apparatus to perform a method of any of aspects 13 through 25.

Aspect 30: An apparatus for wireless communication at a target UE, comprising at least one means for performing a method of any of aspects 13 through 25.

Aspect 31: A non-transitory computer-readable medium storing code for wireless communication at a target UE, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at an initiator user equipment (UE), comprising:
   broadcasting, via a sidelink connection to a plurality of target UEs, a group sidelink communication request that comprises a sidelink ranging service identifier;
   establishing, via the sidelink connection, a plurality of unicast sidelink sessions with the plurality of target UEs;
   transmitting, via the sidelink connection, a plurality of position reference signal requests via the plurality of unicast sidelink sessions to initiate a plurality of sidelink ranging sessions; and
   receiving, via the sidelink connection, a plurality of position reference signal responses from the plurality of target UEs during each of the plurality of sidelink ranging sessions.

2. The method of claim 1, wherein broadcasting the group sidelink communication request comprises:
   transmitting, via the sidelink connection to the plurality of target UEs, the group sidelink communication request comprising a broadcast identifier or a groupcast identifier.

3. The method of claim 2, further comprising:
   transmitting a broadcast position reference signal message or a groupcast position reference signal message comprising the broadcast identifier or the groupcast identifier.

4. The method of claim 2, wherein receiving the plurality of position reference signal responses comprises:
   receiving the plurality of position reference signal responses that are each a broadcast position reference signal response corresponding to the broadcast identifier or are each a groupcast position reference signal response corresponding to the groupcast identifier.

5. The method of claim 1, further comprising:
   transmitting at least one position reference signal confirmation message in response to the plurality of position reference signal responses.

6. The method of claim 5, wherein transmitting the at least one position reference signal confirmation message comprises:
   transmitting a plurality of unicast position reference signal confirmation messages in response to the plurality of position reference signal responses.

7. The method of claim 5, wherein transmitting the at least one position reference signal confirmation message comprises:
   transmitting a broadcast position reference signal confirmation message or a groupcast position reference signal confirmation message in response to the plurality of position reference signal responses.

8. The method of claim 1, wherein receiving the plurality of position reference signal responses comprises:
   receiving the plurality of position reference signal responses that are each a unicast position reference signal response.

9. The method of claim 1, wherein
   the plurality of sidelink ranging sessions comprise a plurality of application layer ranging sessions, and
   the plurality of position reference signal requests and the plurality of position reference signal responses are processed at an application layer.

10. The method of claim 1, wherein
    the plurality of sidelink ranging sessions comprise a plurality of sidelink physical layer ranging sessions, and
    the plurality of position reference signal requests and the plurality of position reference signal responses are processed at a sidelink physical layer.

11. The method of claim 1, wherein
    the plurality of sidelink ranging sessions comprise a plurality of radio resource control layer ranging sessions, and
    the plurality of position reference signal requests and the plurality of position reference signal responses are processed at a radio resource control layer.

12. The method of claim 1, wherein the group sidelink communication request comprises a PC5 sidelink message and the sidelink ranging service identifier comprises a vehicle-to-everything (V2X) service identifier.

13. A method for wireless communication at a target user equipment (UE), comprising:
    receiving, from an initiator UE via a sidelink connection, a group sidelink communication request that comprises a sidelink ranging service identifier;
    establishing, via the sidelink connection, a unicast sidelink session with the initiator UE;
    receiving, via the sidelink connection, a position reference signal request via the unicast sidelink session to initiate a sidelink ranging session; and
    transmitting, via the sidelink connection, a position reference signal response to the initiator UE during the sidelink ranging session.

14. The method of claim 13, wherein receiving the group sidelink communication request comprises:
    receiving the group sidelink communication request broadcasted to a plurality of target UEs.

15. The method of claim 13, wherein receiving the group sidelink communication request comprises:
    receiving, from the initiator UE via the sidelink connection, the group sidelink communication request comprising a broadcast identifier or a groupcast identifier.

16. The method of claim 15, further comprising:
    receiving a broadcast position reference signal message or a groupcast position reference signal message comprising the broadcast identifier or the groupcast identifier.

17. The method of claim 15, wherein transmitting the position reference signal response comprises:
    transmitting a broadcast position reference signal response corresponding to the broadcast identifier or a groupcast position reference signal response corresponding to the groupcast identifier.

18. The method of claim 13, further comprising:
    receiving a position reference signal confirmation message in response to the position reference signal response.

19. The method of claim 18, wherein receiving the position reference signal confirmation message comprises:
    receiving a unicast position reference signal confirmation in response to the position reference signal response.

20. The method of claim 18, wherein receiving the position reference signal confirmation message comprises:
    receiving a broadcast position reference signal confirmation message or a groupcast position reference signal confirmation message in response to the position reference signal response.

21. The method of claim 13, wherein transmitting the position reference signal response comprises:
    transmitting a unicast position reference signal response.

22. The method of claim 13, wherein
    the sidelink ranging session comprises an application layer ranging session, and the position reference signal request and the position reference signal response are processed at an application layer.

23. The method of claim 13, wherein
the sidelink ranging session comprises a sidelink physical layer ranging session, and
the position reference signal request and the position reference signal response are processed at a sidelink physical layer.

24. The method of claim 13, wherein
the sidelink ranging session comprises a radio resource control layer ranging session, and
the position reference signal request and the position reference signal response are processed at a radio resource control layer.

25. The method of claim 13, wherein the group sidelink communication request comprises a PC5 sidelink message and the sidelink ranging service identifier comprises a vehicle-to-everything (V2X) service identifier.

26. An apparatus for wireless communication at an initiator user equipment (UE), comprising:
a processor;
memory coupled with the processor; and
instructions stored in the memory and executable by the processor to cause the apparatus to:
broadcasting, via a sidelink connection to a plurality of target UEs, a group sidelink communication request that comprise a sidelink ranging service identifier;
establish, via the sidelink connection, a plurality of unicast sidelink sessions with the plurality of target UEs;
transmit, via the sidelink connection, a plurality of position reference signal requests via the plurality of unicast sidelink sessions to initiate a plurality of sidelink ranging sessions; and
receive, via the sidelink connection, a plurality of position reference signal responses from the plurality of target UEs during each of the plurality of sidelink ranging sessions.

27. The apparatus of claim 26, further comprising a transmitter, wherein the instructions to broadcast the group sidelink communication request are executable by the processor to cause the apparatus to:
transmit, using the transmitter via the sidelink connection to the plurality of target UEs, the group sidelink communication request comprising a broadcast identifier or a groupcast identifier.

28. The apparatus of claim 27, wherein the instructions are further executable by the processor to cause the apparatus to:
transmit a broadcast position reference signal message or a groupcast position reference signal message comprising the broadcast identifier or the groupcast identifier.

29. An apparatus for wireless communication at a target user equipment (UE), comprising:
a processor;
memory coupled with the processor; and
instructions stored in the memory and executable by the processor to cause the apparatus to:
receive, from an initiator UE via a sidelink connection, a group sidelink communication request that comprises a sidelink ranging service identifier;
establish, via the sidelink connection, a unicast sidelink session with the initiator UE;
receive, via the sidelink connection, a position reference signal request via the unicast sidelink session to initiate a sidelink ranging session; and
transmit, via the sidelink connection, a position reference signal response to the initiator UE during the sidelink ranging session.

30. The apparatus of claim 29, further comprising a receiver, wherein the instructions to receive the group sidelink communication request are executable by the processor to cause the apparatus to:
receive, via the receiver, the group sidelink communication request broadcasted to a plurality of target UEs.

* * * * *